United States Patent
Li et al.

(10) Patent No.: US 11,375,200 B2
(45) Date of Patent: Jun. 28, 2022

(54) VIDEO CODING METHOD AND DEVICE FOR CONTROLLING COLOR COMPONENT PROCESSING

(71) Applicant: Tencent America LLC, Palo Alto, CA (US)

(72) Inventors: Xiang Li, Saratoga, CA (US); Ling Li, Seoul (KR); Guichun Li, Milpitas, CA (US); Shan Liu, San Jose, CA (US); Lien-Fei Chen, Taipei (TW)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 17/096,937

(22) Filed: Nov. 12, 2020

(65) Prior Publication Data

US 2021/0195201 A1 Jun. 24, 2021

Related U.S. Application Data

(60) Provisional application No. 62/953,459, filed on Dec. 24, 2019, provisional application No. 62/953,455,
(Continued)

(51) Int. Cl.
*H04N 19/46* (2014.01)
*H04N 19/132* (2014.01)
(Continued)

(52) U.S. Cl.
CPC ......... *H04N 19/132* (2014.11); *H04N 19/176* (2014.11); *H04N 19/186* (2014.11); *H04N 19/46* (2014.11); *H04N 19/60* (2014.11)

(58) Field of Classification Search
CPC .... H04N 19/176; H04N 19/186; H04N 19/46; H04N 19/174; H04N 19/132; H04N 19/103; H04N 19/70; H04N 19/60
See application file for complete search history.

(56) References Cited

U.S. PATENT DOCUMENTS

2011/0302334 A1* 12/2011 Ponnatota ......... H04L 12/40136
710/30
2017/0150157 A1* 5/2017 Yamori ................ H04N 19/136
(Continued)

*Primary Examiner* — Dave Czekaj
*Assistant Examiner* — Berteau Joisil
(74) *Attorney, Agent, or Firm* — Anova Law Group, PLLC

(57) ABSTRACT

A method for controlling color component processing for a decoder includes: obtaining a coded video bitstream, the video bitstream being coded from a source having a RGB color format; decoding, signaling information of a current coding unit (CU) in a segment of a current picture from the coded video bitstream, the signaling information includes prediction information of the current CU and a control signal for processing chroma components of the current CU in a prediction residual domain; determining, according to the control signal, residual information of the current CU, comprising: determining, according to the control signal, adaptive color transform (ACT) enablement information; and when the ACT enablement information indicates that ACT is used for the current CU, obtaining the residual information by converting residuals at YCgCo domain obtained from inverse transform to residuals at RGB domain; and reconstructing the current CU based on the residual information and the prediction information.

20 Claims, 6 Drawing Sheets

Related U.S. Application Data filed on Dec. 24, 2019, provisional application No. 62/960,043, filed on Jan. 12, 2020.

(51) Int. Cl.
*H04N 19/176* (2014.01)
*H04N 19/186* (2014.01)
*H04N 19/60* (2014.01)

(56) References Cited

U.S. PATENT DOCUMENTS

| | | | |
|---|---|---|---|
| 2020/0112736 A1* | 4/2020 | Rusanovskyy | H04N 19/182 |
| 2021/0176479 A1* | 6/2021 | Liao | H04N 19/14 |

\* cited by examiner

X = Location of luma sample
O = Location of chroma sample

X = Location of luma sample
O = Location of chroma sample

X = Location of luma sample
O = Location of chroma sample

VIDEO CODING METHOD AND DEVICE FOR CONTROLLING COLOR COMPONENT PROCESSING

CROSS REFERENCE TO RELATED APPLICATIONS

This application claims priority to U.S. provisional patent application No. 62/953,459, filed on Dec. 24, 2019, U.S. provisional patent application No. 62/953,455, filed on Dec. 24, 2019, and U.S. provisional patent application No. 62/960,043, filed on Jan. 12, 2020, contents of all of which are incorporated by reference in their entirety.

FIELD OF THE TECHNOLOGY

This application relates to the field of video technologies and, specifically, to a method and device for controlling color component processing.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to develop the next video coding standard beyond HEVC. JVET formally launched the standardization process of next-generation video coding beyond HEVC, i.e., the Versatile Video Coding (VVC), and established VVC Test Model (VTM) algorithm description and encoding meth od.

In video coding, color transform may be performed for efficiency. However, current color transform scheme may introduce signaling redundancy, overlapping coding tools, and high buffer size requirements at certain scenarios.

The disclosed methods and systems are directed to solve one or more problems set forth above and other problems.

SUMMARY

One aspect of the present disclosure provides a method for controlling color component processing for a decoder includes: obtaining a coded video bitstream, the video bitstream being coded from a source having a RGB color format; decoding, signaling information of a current coding unit (CU) in a segment of a current picture from the coded video bitstream, the signaling information includes prediction information of the current CU and a control signal for processing chroma components of the current CU in a prediction residual domain; determining, according to the control signal, residual information of the current CU, comprising: determining, according to the control signal, adaptive color transform (ACT) enablement information; and when the ACT enablement information indicates that ACT is used for the current CU, obtaining the residual information by converting residuals at YCgCo domain obtained from inverse transform to residuals at RGB domain; and reconstructing the current CU based on the residual information and the prediction information.

Another aspect of the present disclosure provides an electronic device including a memory and a processor coupled to the memory. The processor is configured to perform: obtaining a coded video bitstream, the video bitstream being coded from a source having a RGB color format; decoding, signaling information of a current coding unit (CU) in a segment of a current picture from the coded video bitstream, the signaling information includes prediction information of the current CU and a control signal for processing chroma components of the current CU in a prediction residual domain; determining, according to the control signal, residual information of the current CU, comprising: determining, according to the control signal, adaptive color transform (ACT) enablement information; and when the ACT enablement information indicates that ACT is used for the current CU, obtaining the residual information by converting residuals at YCgCo domain obtained from inverse transform to residuals at RGB domain; and reconstructing the current CU based on the residual information and the prediction information.

Other aspects of the present disclosure can be understood by those skilled in the art in light of the description, the claims, and the drawings of the present disclosure.

DETAILED DESCRIPTION

Figure 1:
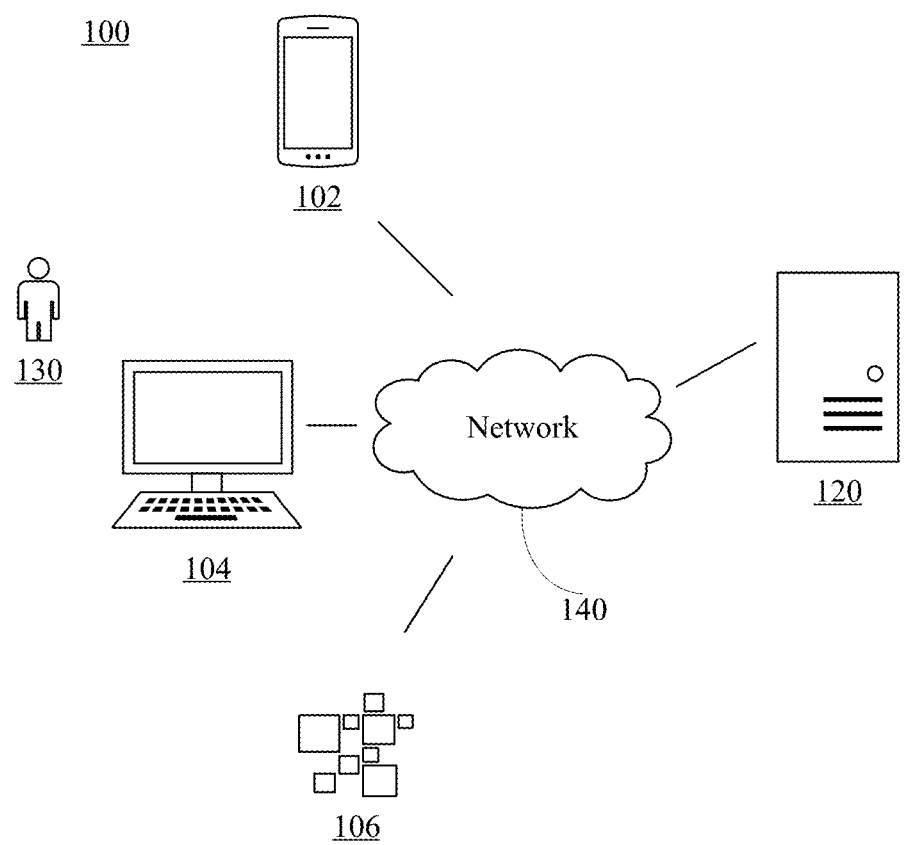
FIG. 1 illustrates an operating environment incorporating certain embodiments of the present disclosure.

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure. Certain terms used in this disclosure are first explained in the followings.

Certain acronyms and terms used in this disclosure are listed as follows. Other acronyms and/or terms not listed may be found from a VVC standard or other related documents.

HEVC: High Efficiency Video Coding
VVC: Versatile Video Coding
JVET: Joint Video Exploration Team
HDR: high dynamic range
SDR: standard dynamic range
SPS: sequence parameter set PPS: picture parameter set
NAL: network abstraction layer
MPM: most probable mode
ACT: Adaptive color transform
BDPCM: Block-based Delta Pulse Code Modulation
WAIP: Wide-Angle Intra Prediction
QT: Quad-Tree—
BT: Binary Tree—
TT: Ternary Tree—
CU: Coding Unit
PU: Prediction Unit
TU: Transform Unit
PDPC: Position Dependent Prediction Combination—
QP: Quantization Parameter
ISP: Intra Sub-Partitions
TPM: Triangular partitioning mode
GEO: Geometric merge mode
SBT: Sub-block transform
CBF: Coded block flag
CCLM: Cross-component Linear Model
DT: DualTree
CCP: Cross Component Prediction
Bitstream: A sequence of bits, in the form of a NAL unit stream or a byte stream, that forms the representation of coded pictures and associated data forming one or more CVS.
VVC: A published version (e.g., VVC draft 7, WET-P2001) of the Specification of VVC standard, which is incorporated herein by reference.
Chroma: An adjective, represented by the symbols Cb and Cr, specifying that a sample array or single sample is representing one of the two color difference signals related to the primary colors.
Coding tree block (CTB): An N×N block of samples for some value of N such that the division of a component into CTBs is a partitioning.
Coding tree unit (CTU): A CTB of luma samples, two corresponding CTBs of chroma samples of a picture that has three sample arrays, or a CTB of samples of a monochrome picture or a picture that is coded using three separate colour planes and syntax structures used to code the samples.
Motion vector (MV): A two-dimensional vector used for inter prediction that provides an offset from the coordinates in the decoded picture to the coordinates in a reference picture.
Flag: A variable or single-bit syntax element that can take one of the two possible values: 0 and 1.
Syntax element: An element of data represented in the bitstream.
Syntax structure: Zero or more syntax elements present together in the bitstream in a specified order.

The disclosed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. In the following, the term block may be interpreted as a prediction block, a coding block, a transform unit, or a coding unit, i.e. CU.

FIG. 1 shows an operating environment 100 incorporating certain embodiments of the present disclosure. As shown in FIG. 1, the operating environment 100 may include a variety of devices with video functionalities. For example, the operating environment 100 may include a mobile device 102, a terminal device 104, and an electronic device 106. Other types of devices may also be included.

The operating environment 100 may also include a server 120, one or more users 130, and a communication network 140 connecting the variety of devices and the server 120. The user(s) 130 may use, access, or control one or more of the variety of devices.

The mobile device 102, the terminal device 104, and the electronic device 106 may be generally referred as a terminal device, which may include any user terminal, such as a personal digital assistant (PDA), a mobile phone, a smart phone, an integrated messaging device (IMD), a tablet computer, a notebook computer, a desktop computer, and other computing devices. The terminal device may also include any image or video capturing devices, such as a digital camera, a video camera, a security camera, a vehicle on-board camera, and a stereo camera, etc., or any electronic device with a video function, such as a digital doorbell, an autonomous driving sensor, a digital voice assistant, a smart speaker, a smart appliance, or any industrial or commercial IoT systems with video processing capability. Any of the mobile device 102, terminal device 104, and electronic device 106 may be stationary or mobile when carried by an individual who is moving, and may also be located as a part or in a mode of transport including a car, a truck, a taxi, a bus, a train, a boat, an airplane, a bicycle, a motorcycle or any similar suitable mode of transport.

The network 140 may include any appropriate type of communication network and may comprise any combination of wired or wireless networks including, but not limited to a wireless cellular telephone network, a wireless local area network (WLAN), a Bluetooth personal area network, an Ethernet local area network, a token ring local area network, a wide area network, and the Internet. The network 140 may also include private or public cloud computing platform for voice/data communication. When the Internet or other type of network is included, connectivity to the Internet may include long range wireless connections, short range wireless connections, and various wired connections including telephone lines, cable lines, power lines, and similar communication pathways.

The server 120 may include any type of server computer system or multiple computer systems configured in a server cluster or distributed in different locations. The server 120 may also include a cloud server on a cloud computing platform. The server 120 may also be referred as a server entity, which may be integrated with any appropriate device (including the electronic device) for performing the disclosed server-side functionalities of video decoding and application processing.

Figure 2:
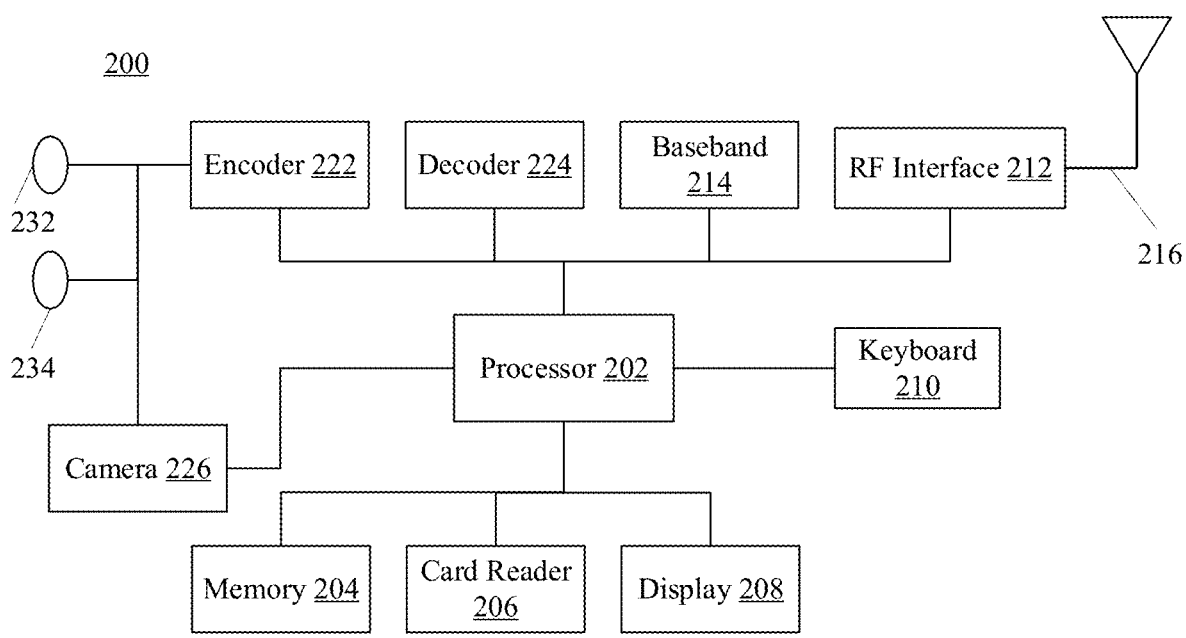
FIG. 2 illustrates a computer system consistent with embodiments of the present disclosure.

FIG. 2 illustrates an exemplary computer system implementing certain aspects of the variety of terminal devices 102, 104, and/or 106, and/or server 120. As shown in FIG. 2, the computer system 200 may include a hardware processor 202, a memory 204, a card reader 206, a display 208, a keyboard 210, a radio-frequency (RF) interface 212, a baseband 214, an antenna 216, an encoder 222, a decoder 224, a camera 226, a speaker 232, and a microphone 234, etc. The components shown in FIG. 2 are illustrative, certain components may be omitted, and other components may be added.

The processor 202 may be provided for controlling the computer system 200. The processor 202 may be connected to other components through one or more bus or other electrical connections to send data to and receive data from the other components. The processor 202 may include one or more processing cores, for example, a 4-core processor or an 8-core processor. The processor 202 may be implemented by using at least one hardware form of digital signal processing (DSP), a field-programmable gate array (FPGA), and a programmable logic array (PLA). The processor 202 may also include a main processor and a coprocessor. The main processor may be a central processing unit (CPU), and the coprocessor may be a graphics processing unit (GPU) configured to be responsible for rendering and drawing content that a display screen needs to display. In some embodiments, the processor 202 may further include an artificial intelligence (AI) processor. The AI processor is configured to process a computing operation related to machine learning.

The memory 204 may include one or more computer-readable storage media, such as a high-speed random access memory and a nonvolatile or non-transitory memory, for example, one or more disk storage devices or flash storage devices. The memory 204 may store both data in the form of image and audio data and may also store instructions for the processor 202. The card reader 206 may include any type of portable card interface, such as a smart card interface, a communication card interface (e.g., near field communication (NFC) card), or a subscriber identifier module (SIM) card or other card interface for providing user information and being suitable for providing authentication information for authentication and authorization of the user 130.

Further, the display 208 may be any suitable display technology suitable to display an image or video. For example, the display 208 may include a liquid crystal display (LCD) screen, an organic light-emitting diode (OLED) screen, or the like, and may be a touch screen. The keyboard 210 may include a physical or virtual keyboard to input information by the user, and may also include other types of input/output devices. The speaker 232 and the microphone 234 may be used to input and output audio for the computer system 200.

The RF interface 212 (together with the antenna 216) may include RF circuitry for receiving and transmit RF signals. The RF interface 212 may convert an electrical signal to an electromagnetic signal for transmission or convert a received electromagnetic signal into an electrical signal for receiving. The RF interface 212 may communicate with other electronic devices through at least one wireless communication protocol. The wireless communication protocol may include a metropolitan area network, mobile communications networks (2G, 3G, 4G, and 5G) of various generations, a wireless local area network (LAN), and/or a wireless fidelity (WiFi) network. In some embodiments, the RF interface 212 may also include a circuit related to near field communication (NFC). The baseband 214 may include circuitry for processing the signals to and from the RF interface 212.

Further, the camera 226 may include any type of imaging or video capturing device configured to collect an image or a video. When the computer system 200 is a portable device carried by the user, the camera 226 may include a front-facing camera and a rear-facing camera. The front-facing camera may be disposed on the front panel of the electronic device, and the rear-facing camera is disposed on a rear surface of the electronic device. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera 226 may further include a flash.

The encoder 222 and the decoder 224 may be referred as the codec circuitry of the electronic device suitable for carrying out coding and decoding of audio and/or video data or assisting in coding and decoding carried out by the processor 202. The encoder 222 and/or the decoder 224 may be implemented as a hardware circuitry in the electronic device 200, or may be implemented as a software program by the electronic device 200, or a combination of the hardware circuitry and the software program. The computer system 200 may implement embodiments of the disclosed method of controlling color transform by using the encoder 222 and/or the decoder 224.

The computer system 200 as shown in FIG. 2 may also include additional structures to implement any particular system. For example, the computer system 200 may include a database, and/or a land-line based network communication interface when implementing the server 120, or may include structures similar to those of a mobile terminal or user equipment of a wireless communication system when implementing the mobile device 102, etc. However, the computer system 200 may include or omit any structure to implement any electronic device or apparatus which may require encoding and decoding, or encoding or decoding video.

Returning to FIG. 1, the computer system 200 (i.e., any one or more of the variety of devices 102, 104, and/or 106) may capture or collect various data (e.g., audio data, environment/operating data, image data, and/or video data) and send the data to the server 120 through the network 140. The computer system 200 may process or pre-process the data before sending the data to the server 120, or may send the unprocessed data to the server 120.

During operation, a user of a terminal device may use a video application to view local video content, or transmit and/or receive video content to and/or from server 120. Alternatively, users of the various terminal devices may use various video applications to communicate video content with each other. In one embodiment, one user may communicate video content with another user via the server 120, or the server 120 may set up the communication channel between the users, so that one user may direct communicate video with the other user via the communication channel.

Figure 3:
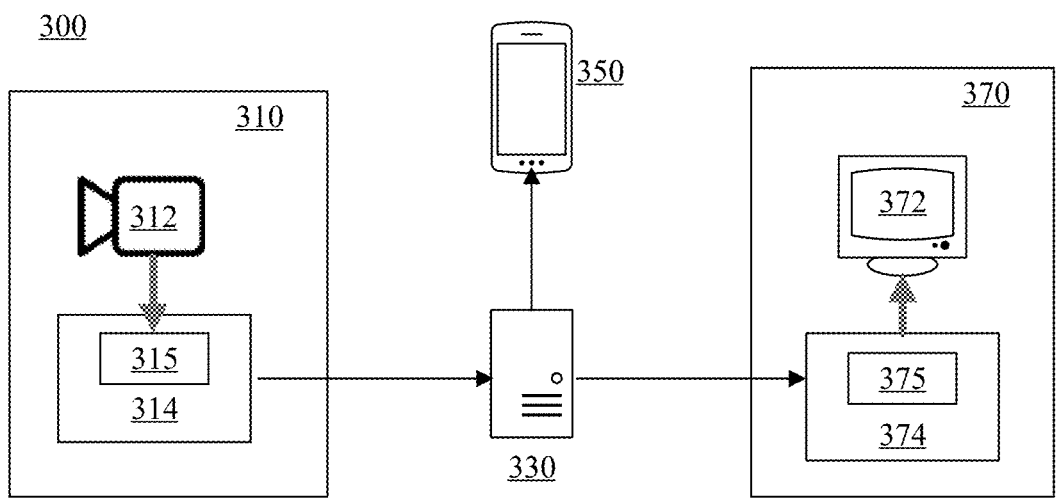
FIG. 3 illustrates an example for a video streaming application according to certain embodiments of the present disclosure.

FIG. 3 illustrates an example for a video streaming application of the present disclosure. The method and device provided by the present disclosure may be equally applicable to other video enabled applications, including, for example, video playback applications, video conferencing, digital TV, storing of compressed video on digital media including CD, DVD, memory stick and the like, and so on.

As shown in FIG. 3, a streaming system 300 may include a video source unit 310, a streaming server 330, a first client streaming device 350, and a second client streaming device 370. The video source unit 310 may include a video capture device 312, for example a digital camera or a digital camcorder, configured to acquire video data stream in an uncompressed format. The video capture device 312 may also be a memory device that stores a video data stream in an uncompressed format. The video data stream in the uncompressed format may have a high data volume compared to encoded video stream data. The video source unit 310 may further include a video processing unit 314 that implements a video encoder 315. The video encoder 315 may include hardware, software, or a combination thereof to enable or implement aspects of the present disclosure as described in more detail below. The video encoder 315 may have similar structure and functions as encoder 222 shown in FIG. 2. The video encoder 315 is configured to process the video stream data in the uncompressed format to generate encoded video stream data. The encoded video stream data has a lower data volume compared to the uncompressed video stream data, and may be transmitted to and stored on a streaming server 330 for live broadcast or on-demand broadcast. Client streaming devices, such as the first client streaming device 350 and second client streaming device 370, can access the streaming server 330 to retrieve copies of the encoded video steam data. The client streaming device 370 may include a video decoder 375, for example, implemented by a video processing unit 374. The video decoder 375 decodes the incoming copy of the encoded video stream data and creates an outgoing stream of decoded video data that can be rendered on a display 372 (e.g., a display screen) or other rendering devices. The video decoder 375 may have similar structure and functions as decoder 224 shown in FIG. 2. The streaming system 300 may implement embodiments of the disclosed method of controlling color transform by using the encoder 315 and/or the decoder 375. In the streaming system 300, the uncompressed video data can be encoded and the video stream data can be decoded according to certain video coding/compression standards. Examples of those standards include ITU-T Recommendation H.265. In an example, the video data is encoded under a video coding standard informally known as Versatile Video Coding (VVC).

Figure 4:
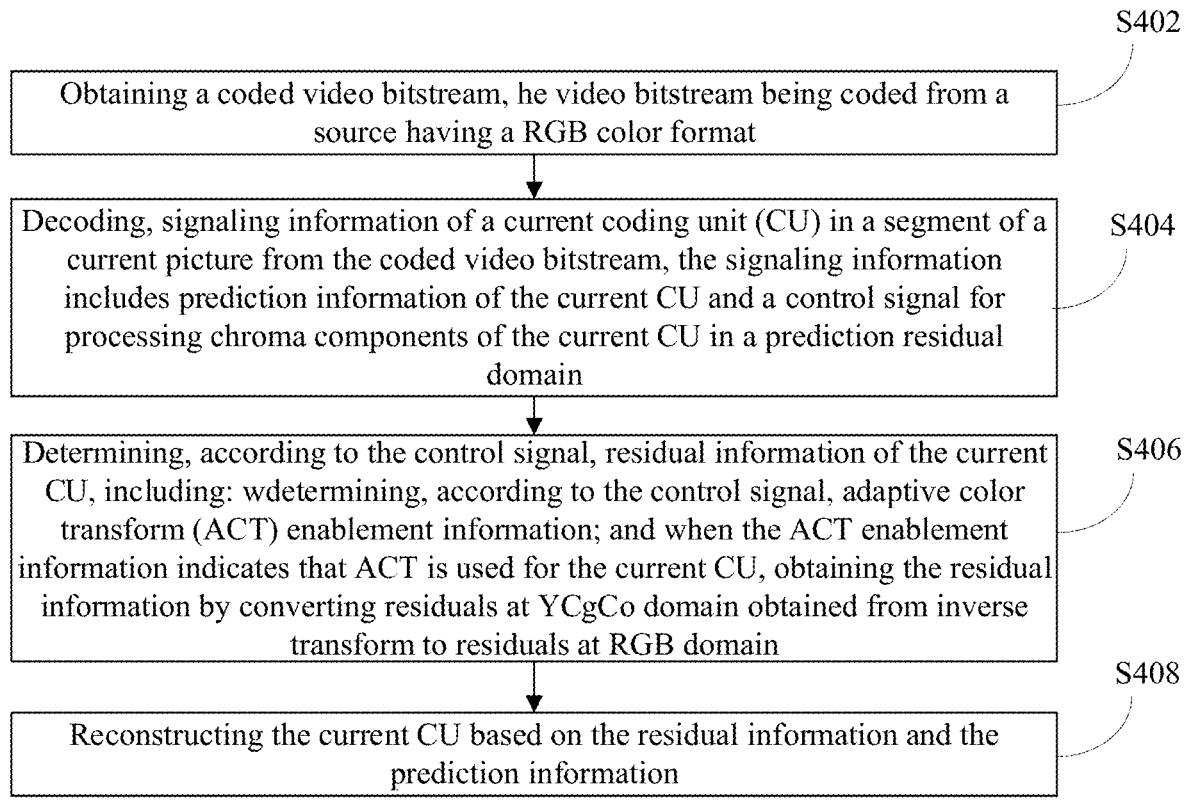
FIG. 4 illustrates an exemplary coding process consistent with some embodiments of the present disclosure.

More generally, FIG. 4 illustrates a video coding process performed by a decoder consistent with the disclosed embodiments. The video coding process can control color component processing in residual domain. The process may be implemented by an electronic device implemented by the computing system 200.

As shown in FIG. 4, at the beginning of the process, a coded video bitstream is obtained (S402). The coded bit stream may be obtained by a video application (e.g., video playback application, video streaming application, screen sharing application, video conferencing application) from a local storage or a remote server. The coded video bitstream may be encoded based on embodiments disclosed in the present disclosure. A source (raw data) of the video bitstream has a RGB (red, green, blue) color format. In other words, the bitstream is coded from a video source having RGB color format.

The color of video samples can be represented in different color formats, e.g, YCbCr (also referred as YUV) or RGB. Frames, slices, and/or pictures of a video having a YUV color format may include luminance (luma) component indicating brightness of the pixels (e.g., one luma sample array) and chrominance (chroma) component indicating color difference components (e.g., two chroma sample array). Accordingly, in this color format, Y indicates luma component, U and V or Cr and Cb indicate color components.

In exemplary embodiments of the present disclosure, luma component may refer to any color component that is coded as the first component in coding order (e.g., (R)ed color component, (G)reen color component, Y color component), and chroma component may refer to any color component that is not coded as the first component in coding order.

Figure 5A:
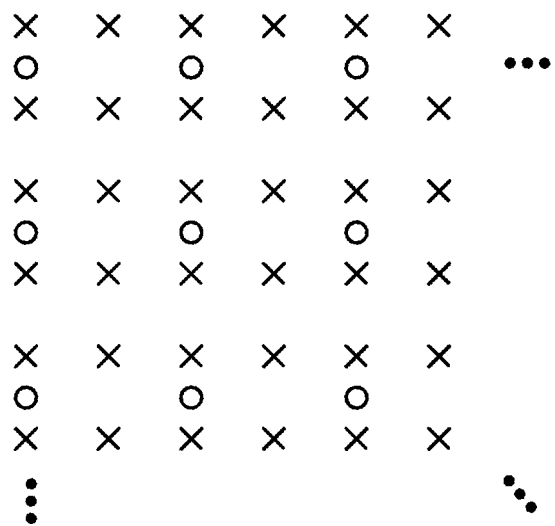
FIGS. 5A-5C illustrate three exemplary color formats consistent with an embodiment of the present disclosure.
Figure 5B:
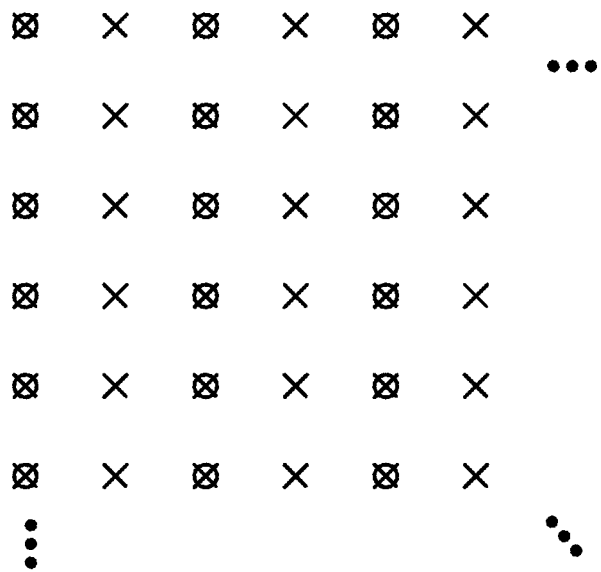
Figure 5C:
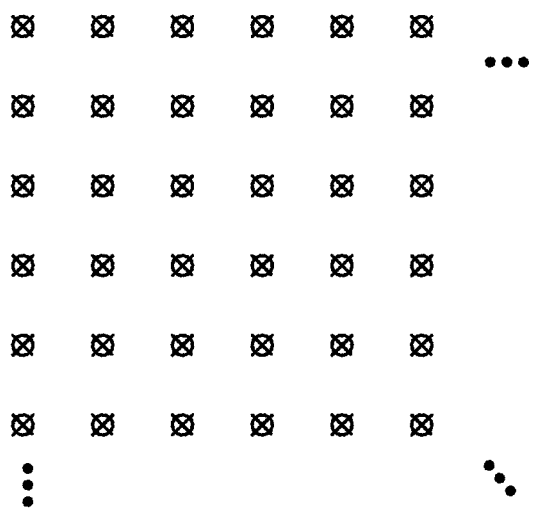

There are different YUV formats, or namely chroma format, which is shown in FIGS. 5A-5C. Different chroma format defines different down-sampling grid of different color components. As shown in FIG. 5A, in 4:2:0 sampling, each of the two chroma arrays has half the height and half the width of the luma array. Alternative chroma sample relative locations may be indicated in VUI parameters as specified in ITU-T H.SEI|ISO/IEC 23002-7. As shown in FIG. 5B, in 4:2:2 sampling, each of the two chroma arrays has the same height and half the width of the luma array. That is, the height of U and V picture is the same as that of Y picture but the width of U and V picture is half of that of Y picture. As shown in FIG. 5C, for YUV 4:4:4 format, each of the two chroma arrays has the same height and width of the luma array. That is, both width and height of U and V picture are the same as that of Y picture. Exemplary embodiments disclosed in the present disclosure are generally realted to video sources whose certain portions may be color transformed for efficient coding.

Returning to FIG. 4, signaling information of a current coding block (CB) in a segment of a current picture may be decoded from the coded video bitstream (S404). The signaling information includes prediction information and a control signal for processing chroma components of the current CU in a prediction residual domain.

The decoder may parse the coded video stream and extract signaling information such as sequence information and parameters for groups of pixels/samples (the groups including pictures, tiles, slices, macroblocks, CTUs, CUs, blocks, transform units, prediction units, etc.), to reconstruct such groups in the video. In the coded video stream, the original video is partitioned into a plurality of segments (e.g., square samples of the same size), such as macroblocks, coding tree units (CTUs), slices, tiles, and the like. The segment may be further partitioned into coding units (CUs) based on its block partitioning structure, also referred as partitioning tree structure, or a coding tree. A CU may have corresponding parameters and prediction information such that a region corresponding to the CU in the original picture of the video can be reconstructed based on the signaling information in a decoding process. The prediction information may include, for example, a prediction type (e.g., inter prediction, intra prediction, combined inter and intra prediction) of luma coding block (CB) of the current CU, a prediction type of chroma CBs of the current CU, inter prediction information (e.g., description of redundant information according to encoding technique, motion vectors, merge mode information, information about reference pictures), and/or intra prediction information (e.g., intra prediction direction information according to intra coding modes and techniques, information about reference blocks in the same picture).

The control signal can conditionally restrict the decoder from using a specific scheme to process color components of the current CU in the prediction residual domain. The control signal may include a Joint Cb Cr Residual (JCCR) enabling flag or a (block-based delta pulse code modulation) BDPCM chroma enabling flag that may restrict the decoder from using adaptive color transform (ACT) on the current CU; or the control signal may include an ACT enabling flag that may restrict the decoder from applying inverse JCCR or BDPCM on chroma components of the current CU. The control signal may indicate size threshold that restrict the decoder from using ACT at block level when block size of the current CU is greater than the size threshold. Details of restrictions could be posed by the control signal to the coding process are described below in accordance with embodiments in step S406.

It is known that in RGB format, the three components, i.e., R, G and B, have strong correlations, which means there are statistical redundancy among these three color components. Color representation of video samples can be converted into different color space using linear transforms. An example conversion from RGB color space to YUV color space according to BT.601 standard is listed below:

$$Y=((66*R+129*G+25*B+128)>>8)+16$$

$$U=((-38*R-74*G+112*B+128)>>8)+128$$

$$V=((112*R-94*G-18*B+128)>>8)+128$$

An example conversion from 8-bit YUV format to RGB format according to BT.601 standard is listed below. Specifically, from the original RGB-to-YUV formulas, one can derive the following relationships for BT.601.

$$Y=\text{round}(0.256788*R+0.504129*G+0.097906*B)+16$$

$$U=\text{round}(-0.148223*R-0.290993*G+0.439216*B)+128$$

$$V=\text{round}(0.439216*R-0.367788*G-0.071427*B)+128$$

Accordingly, given coefficients $C_0$, D, and E, where $C=Y-16$, $D=U-128$, and $E=V-128$, the formulas to convert YUV to RGB can be derived as follows:

$$R=\text{clip}(\text{round}(1.164383*C+1.596027*E))$$

$$G=\text{clip}(\text{round}(1.164383*C-(0.391762*D)-(0.812968*E)))$$

$$B=\text{clip}(\text{round}(1.164383*C+2.017232*D))$$

where clip( ) denotes clipping to a range of [0 . . . 255]. Further, the above formulas can be reasonably approximated by the following:

$$R=\text{clip}((298*C+409*E+128)>>8)$$

$$G=\text{clip}((298*C-100*D-208*E+128)>>8)$$

$$B=\text{clip}((298*C+516*D+128)>>8)$$

For efficient coding of RGB video content, the in-loop Adaptive Colour Transform (ACT) was adopted into SCM (the software test model of screen content coding extension of HEVC), where ACT is operated in the residue domain, and a CU-level flag is signaled to indicate the usage of the color-space transform.

For efficient coding of RGB video content, in-loop Adaptive Colour Transform (ACT) was adopted into SCM (the software test model of screen content coding extension of HEVC), where ACT is operated in the residue domain, and a CU-level flag is signaled to indicate the usage of the color-space transform.

Figure 6:
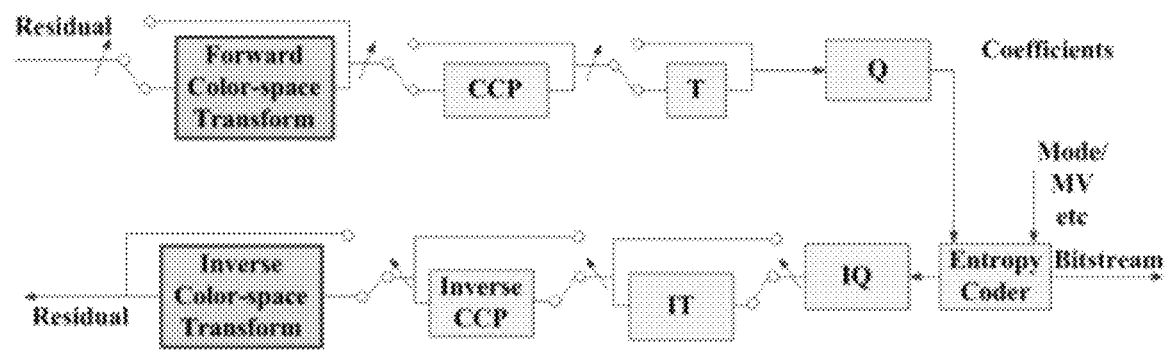
FIG. 6 illustrate an encoding flow chart using color transform consistent with an embodiment of the present disclosure.
Figure 7:
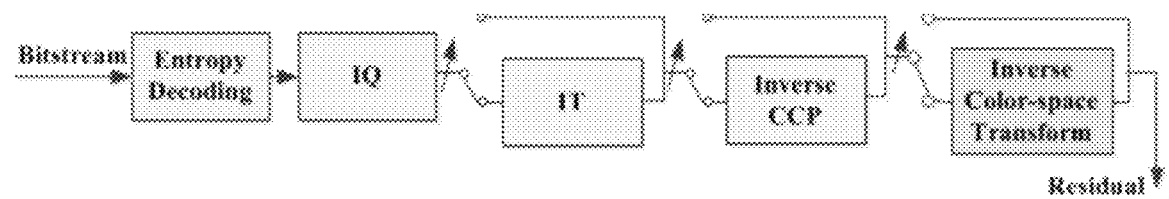
FIG. 7 illustrate a decoding flow chart using color transform consistent with an embodiment of the present disclosure.

The color transform used in SCM are follows:

Forward transform: $\begin{bmatrix} Y \\ C_g \\ C_o \end{bmatrix} = \frac{1}{4} \begin{bmatrix} 1 & 2 & 1 \\ -1 & 2 & -1 \\ 2 & 0 & -2 \end{bmatrix} \times \begin{bmatrix} R \\ G \\ B \end{bmatrix}$ Backward transform: $\begin{bmatrix} R \\ G \\ B \end{bmatrix} = \begin{bmatrix} 1 & -1 & 1 \\ 1 & 1 & 0 \\ 1 & -1 & -1 \end{bmatrix} \times \begin{bmatrix} Y \\ C_g \\ C_o \end{bmatrix}$ FIG. 6 illustrate an encoding flow chart using color transform in SCM. As shown in FIG. 6, the color-space transform is applied to residuals in the encoding process to convert the residuals at the input color space (e.g., RGB domain) to YCgCo domain, and residuals at YCgCo domain are used for cross component prediction and transform process. FIG. 7 illustrate a decoding flow chart using color transform in SCM. As shown in FIG. 7, inverse color-space transform is applied after inverse transform of coefficients to convert residuals in YCgCo domain back to RGB domain.

Figure 8:
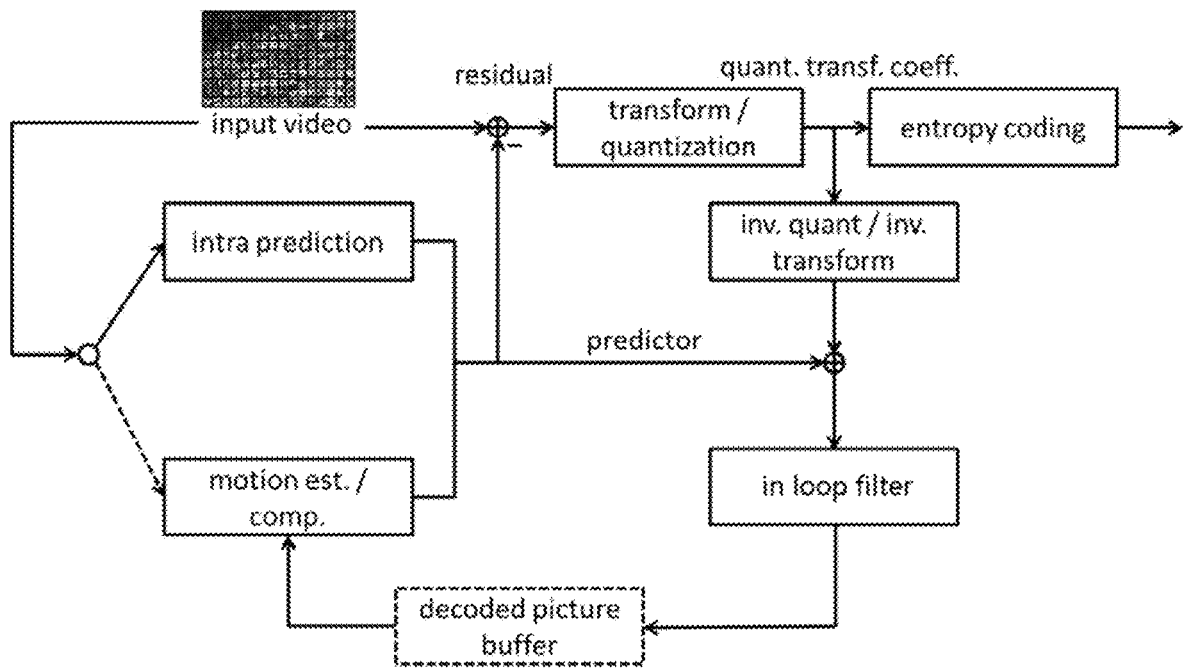
FIG. 8 illustrate another encoding flow chart using color transform consistent with an embodiment of the present disclosure.
Figure 9:
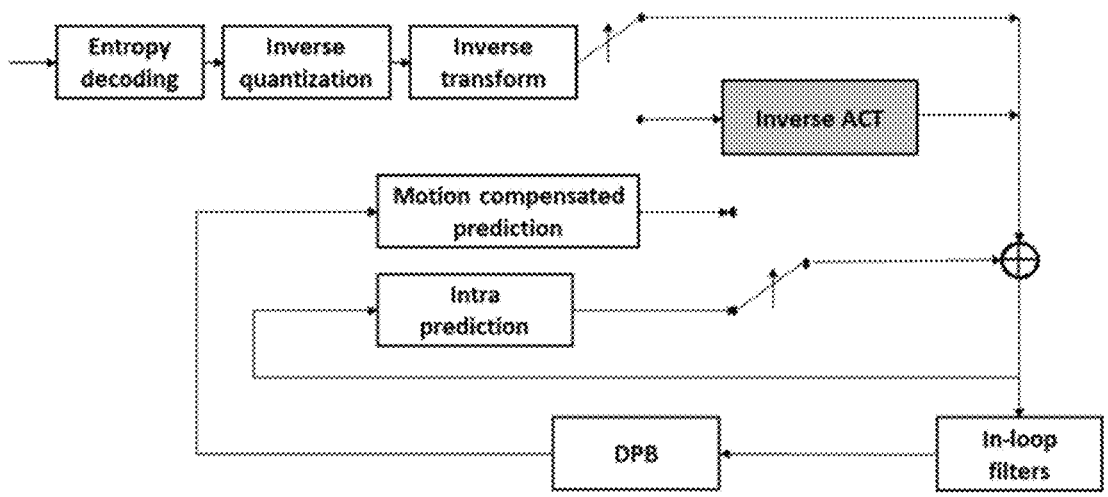
FIG. 9 illustrate another decoding flow chart using color transform consistent with an embodiment of the present disclosure.

JVET-P0517 proposes to include the ACT tool in HEVC into the VVC framework to enhance the efficiency of 4:4:4 chroma format coding. FIG. 8 illustrates the encoding flowchart in accordance with VTM. Two color spaces are adaptively selected by signaling one ACT flag at CU level, i.e., a block-level ACT enabling flag. When the flag is equal to one, the residuals of the CU are coded in the YCgCo space; otherwise, the residuals of the CU are coded in the original color space. Same as in HEVC, if ACT is enabled, the ACT performs in-loop color space conversion in the prediction residual domain by adaptively converting the residuals from the input color space to YCgCo space, and then the encoding process moves on to the transform/quantization step based on the residuals coded in YCgCo space. FIG. 9 illustrates the decoding flowchart in VVC with the ACT be applied. As illustrated in FIG. 9, the color space conversion is carried out in residual domain. Specifically, one additional decoding module, namely inverse ACT, is introduced after inverse transform to convert the residuals from YCgCo domain back to the original domain.

In VVC, unless the maximum transform size is smaller than the width or height of one coding unit (CU), one CU leaf node is also used as the unit of transform processing. Therefore, in the implementation, the ACT flag is signaled for one CU to select the color space for coding its residuals. Additionally, following the HEVC ACT design, for inter and IBC CUs, the ACT is only enabled when there is at least one non-zero coefficient in the CU. For intra CUs, the ACT is only enabled when chroma components select the same intra prediction mode of luma component, i.e., DM mode.

The core transforms used for the color space conversions are kept the same as that used for the HEVC. Specifically, the following forward and inverse YCgCo color transform matrices, as described as follows, is applied:

$$\begin{bmatrix} C'_0 \\ C'_1 \\ C'_2 \end{bmatrix} = \begin{bmatrix} 2 & 1 & 1 \\ 2 & -1 & -1 \\ 0 & -2 & 2 \end{bmatrix} \begin{bmatrix} C_0 \\ C_1 \\ C_2 \end{bmatrix} / 4$$

$$\begin{bmatrix} Y \\ Co \\ Cg \end{bmatrix} = \begin{bmatrix} 1 & 2 & 1 \\ 2 & 0 & -2 \\ -1 & 2 & -1 \end{bmatrix} \begin{bmatrix} R \\ G \\ B \end{bmatrix}$$

$$\begin{bmatrix} Y \\ Co \\ Cg \end{bmatrix} = \begin{bmatrix} 1 & 2 & 1 \\ 2 & 0 & -2 \\ -1 & 2 & -1 \end{bmatrix} \begin{bmatrix} R \\ G \\ B \end{bmatrix}$$

$$\begin{bmatrix} C_0 \\ C_1 \\ C_2 \end{bmatrix} = \begin{bmatrix} 1 & 1 & 0 \\ 1 & -1 & -1 \\ 1 & -1 & 1 \end{bmatrix} \begin{bmatrix} C'_0 \\ C'_1 \\ C'_2 \end{bmatrix}$$

where $C'_0$, $C'_1$, and $C'_2$ are color components respectively correspond to Y, Cg, and Co, and $C_0$, $C_1$, and $C_2$ are color components respectively correspond to G, B, and R.

Additionally, the ACT transform matrices are not normalized. To compensate the dynamic range change of residuals signals before and after color transform, the QP adjustments of (−5, −5, −3) are applied to the transform residuals of Y, Cg and Co components, respectively. The adjusted quantization parameter only affects the quantization and inverse quantization of the residuals in the CU.

On the other hand, as shown in the above forward and inverse YCgCo color transform matrices, the forward and inverse color transforms need to access the residuals of all three components. Correspondingly, in the implementation, the ACT is disabled in the following two scenarios (separate-tree partition and ISP mode) where not all residuals of three components are available and the prediction block size of different color component is different. Separate-tree partition: when separate-tree is applied, luma and chroma samples inside one CTU are partitioned by different structures. This results in that the CUs in the luma-tree only contains luma component and the CUs in the chroma-tree only contains two chroma components. Intra sub partition prediction (ISP): the ISP sub-partition is only applied to luma while chroma signals are coded without splitting. In the current ISP design, except the last ISP sub-partitions, the other sub-partitions only contain luma component.

Returning to FIG. 4, the residual information of the current CU may be determined according to the control signal (S406). As previously discussed, luma component may refer to any color component that is coded as the first component in coding order (e.g., (R)ed color component, (G)reen color component, Y color component), and chroma component may refer to any color component that is not coded as the first component in coding order. Adaptive color transform or inverse ACT involves all three components in the coded data and is considered as one type of chroma component processing that may be performed by the decoder at the residual domain. Other types of chroma component processing that may be performed by the decoder at the residual domain may include BDPCM and JCCR. These different types of chroma component processing may not happen for the same CU. That is, if ACT is performed, then BDPCM is not performed, and vice versa; if JCCR is performed, then ACT is not performed, and vice versa.

The present disclosure provides embodiments where an enabling flag for one type of chroma component processing functions as a control signal for another type of chroma component processing in the residual domain. The present disclosure also provides embodiments where size threshold functions as a control signal for ACT in the residual domain. Accordingly, the residual information can be determined based on the control signal. The embodiments are generally described in three groups: the first group of embodiments address situations related to implementations of ACT and block-based delta pulse code modulation (BDPCM) in the coding process, the second group of embodiments address situations related to implementations of ACT and Joint Cb Cr Residual (JCCR) coding, and the third group of embodiments address situations of implementations of ACT at block level based on size information.

Specifically, ACT enablement information may be determined based on the control signal; and when the ACT enablement information indicates that ACT is used for the current CU, the residual information of the current CU may be obtained by converting residuals at YCgCo domain obtained from inverse transform to residuals at RGB domain. The ACT enablement information may include at least one of a sample-level ACT enabling flag, or a block-level ACT enabling flag.

As used herein, a sample-level flag may refer to signaling at a sample level higher than a block level in the video bitstream, and may apply to coding units/blocks in the same segment of the current picture, the same picture, or pictures in the same sequence based on the sample level. For example, the sample-level flag may be applied at a sequence level, a slice level, a tile group level if exists, etc. The sample-level flag may be signaled in, for example, a picture parameter set (PPS), a sequence parameter set (SPS), an adaptation parameter set (APS), a picture header, a slice header, etc. The block level is the partitioning level of the current CU. A block-level flag or CU level flag, as used herein, may refer to signaling at a coding unit/block level.

ACT-related signaling in VVC is described in coding unit syntax as shown in Table 1.

TABLE 1

Coding unit syntax for ACT

| | Descriptor |
|---|---|
| coding_unit( x0, y0, cbWidth, cbHeight, cqtDepth, treeType, modeType ) { | |
|   chType = treeType = = DUAL_TREE_CHROMA ? 1 : 0 | |
|   if( slice_type != I \|\| sps_ibc_enabled_flag ) { | |
|     if( treeType != DUAL_TREE_CHROMA && | |
|       ( ( !( cbWidth = = 4 && cbHeight = = 4 ) && modeType != MODE_TYPE_INTRA ) | |
|       \|\| ( sps_ibc_enabled_flag && cbWidth <= 64 && cbHeight <= 64 ) ) ) | |
|       cu_skip_flag[ x0 ][ y0 ] | ae(v) |
|     if( cu_skip_flag[ x0 ][ y0 ] = = 0 && slice_type != I | |
|       && !( cbWidth = = 4 && cbHeight = = 4 ) && modeType = = MODE_TYPE_ALL ) | |
|       pred_mode_flag | ae(v) |
|     if( ( ( slice_type = = I && cu_skip_flag[ x0 ][ y0 ] = =0 ) \|\| | |
|       ( slice_type != I && ( CuPredMode[ chType ][ x0 ][ y0 ] != MODE_INTRA \|\| | |
|       ( ( ( cbWidth = = 4 && cbHeight = = 4 ) \|\| modeType = = MODE_TYPE_INTRA ) | |
|       && cu_skip_flag[ x0 ][ y0 ] = = 0 ) ) ) ) && | |
|       cbWidth <= 64 && cbHeight <= 64 && modeType != MODE_TYPE_INTER && | |
|       sps_ibc_enabled_flag && treeType != DUAL_TREE_CHROMA ) | |
|       pred_mode_ibc_flag | ae(v) |
|   } | |
|   if( CuPredMode[ chType ][ x0 ][ y0 ] = = MODE_INTRA && sps_palette_enabled_flag && | |
|     cbWidth <= 64 && cbHeight <= 64 && cu_skip_flag[ x0 ][ y0 ] = = 0 && | |
|     modeType != MODE_TYPE_INTER ) | |
|     pred_mode_plt_flag | ae(v) |
|   } | |
|   if( CuPredMode[ chType ][ x0 ][ y0 ] = = MODE _INTRA && sps_act_enabled_flag && | |
|     treeType = = SINGLE_TREE ) | |
|     cu_act_enabled_flag | ae(v) |

TABLE 1-continued

Coding unit syntax for ACT

| | Descriptor |
|---|---|
| ```
if( CuPredMode[ chType ][ x0 ][ y0 ] = = MODE_INTRA ||
    CuPredMode[ chType ][ x0 ][ y0 ] = = MODE_PLT ) {
  if( treeType = = SINGLE_TREE || treeType = = DUAL_TREE_LUMA ) {
    if( pred_mode_plt_flag ) {
      palette_coding( x0, y0, cbWidth, cbHeight, treeType )
    } else {
      if( sps_bdpcm_enabled_flag &&
          cbWidth <= MaxTsSize && cbHeight <= MaxTsSize )
        intra_bdpcm_luma_flag
      if( intra_bdpcm_luma_flag )
        intra_bdpcm_luma_dir_flag
      else {
        if( sps_mip_enabled_flag )
          intra_mip_flag[ x0 ][ y0 ]
        if( intra_mip_flag[ x0 ][ y0 ] ) {
          intra_mip_transposed[ x0 ][ y0 ]
          intra_mip_mode[ x0 ][ y0 ]
        } else {
          if( sps_mrl_enabled_flag && ( ( y0 % CtbSizeY ) > 0 ) )
            intra_luma_ref_idx[ x0 ][ y0 ]
          if( sps_isp_enabled_flag && intra_luma_ref_idx[ x0 ][ y0 ] = = 0 &&
              ( cbWidth <= MaxTbSizeY && cbHeight <= MaxTbSizeY ) &&
              ( cbWidth * cbHeight > MinTbSizeY * MinTbSizeY ) && !cu_act_enabled_
              flag )
            intra_subpartitions_mode_flag[ x0 ][ y0 ]
          if( intra_subpartitions_mode_flag[ x0 ][ y0 ] = = 1 )
            intra_subpartitions_split_flag[ x0 ][ y0 ]
          if( intra_luma_ref_idx[ x0 ][ y0 ] = = 0 )
            intra_luma_mpm_flag[ x0 ][ y0 ]
          if( intra_luma_mpm_flag[ x0 ][ y0 ] ) {
            if( intra_luma_ref_idx[ x0 ][ y0 ] = = 0 )
              intra_luma_not_planar_flag[ x0 ][ y0 ]
            if( intra_luma_not_planar_flag[ x0 ][ y0 ] )
              intra_luma_mpm_idx[ x0 ][ y0 ]
          } else
            intra_luma_mpm_remainder[ x0 ][ y0 ]
        }
      }
    }
  }
  if( ( treeType = = SINGLE_TREE || treeType = = DUAL_TREE_CHROMA ) &&
      ChromaArrayType != 0 ) {
    if( pred_mode_plt_flag && treeType = = DUAL_TREE_CHROMA )
      palette_coding( x0, y0, cbWidth / SubWidthC, cbHeight / SubHeightC, treeType )
    else {
      if( !cu_act_enabled_flag ) {
        if( cbWidth <= MaxTsSize && cbHeight <= MaxTsSize &&
            sps_bdpcm_chroma_enabled_flag )
          intra_bdpcm_chroma_flag
        if( intra_bdpcm_chroma_flag )
          intra_bdpcm_chroma_dir_flag
        } else {
          if( CclmEnabled )
            cclm_mode_flag
          if( cclm_mode_flag )
            cclm_mode_idx
          else
            intra_chroma_pred_mode
        }
      }
    }
  }
}
...
}
``` | ae(v)<br><br>ae(v)<br><br><br>ae(v)<br><br>ae(v)<br>ae(v)<br><br><br>ae(v)<br><br><br><br><br><br>ae(v)<br><br>ae(v)<br><br>ae(v)<br><br>ae(v)<br><br>ae(v)<br>ae(v)<br><br><br><br><br><br><br>ae(v)<br><br>ae(v)<br><br>ae(v)<br><br>ae(v)<br><br>ae(v) |

The ACT related semantics are described as following.

sps_act_enabled_flag equal to 1 specifies that adaptive color transform may be used and the cu_act_enabled_flag may be present in the coding unit syntax. sps_act_enabled_flag equal to 0 specifies that adaptive color transform is not used and cu_act_enabled_flag is not present in the coding unit syntax. When sps_act_enabled_flag is not present, it is inferred to be equal to 0.

cu_act_enabled_flag equal to 1 specifies that the residuals of the current coding unit are coded in YCgCo color space. cu_act_enabled_flag equal to 0 specifies that the residuals of the current coding unit are coded in original color space. When cu_act_enabled_flag is not present, it is inferred to be equal to 0.

Here, sps_act_enabled_flag is a sample-level ACT enabling flag, and cu_act_enabled_flag a block-level ACT enabling flag. It can be understood that the ACT enablement information may include sample-level ACT enabling flag at another level higher than the block level, such as a slice level flag, a tile group level flag, etc.

Generally, a value of the sample-level ACT enabling flag being 0 indicates that ACT is not used for any CUs belonging to the sample level; and the ACT enablement information may not include the block-level ACT enabling flag (e.g., cu_act_enabled_flag). Further, the block-level ACT enabling flag corresponding to the current coding block is not present in the signaling information). When the sample-level ACT enabling flag is not present (i.e., not included in the signaling information), it is inferred to be equal to 0. When the ACT enablement information indicates that ACT is not used for the current CU, the residuals at original color domain are obtained as the residual information in the decoding process.

A value of the sample-level ACT enabling flag being 1 indicates that ACT may be used and the block-level ACT enabling flag may be present in the coding unit syntax for some coding unit(s) belonging to the sample level. The ACT enablement information may further include the block-level ACT enabling flag (e.g., cu_act_enabled_flag) for the current CB.

A value of the block-level ACT enabling flag being 0 specifies that the residuals of the current coding unit are coded in original color space (e.g., RGB). When the block-level ACT enabling flag is not present, it is inferred to be equal to 0. The value of the block-level ACT enabling flag being equal to 1 specifies that the residuals of the current coding unit are coded in YCgCo color space. In response to the block-level ACT enabling flag being 1, the decoder may perform inverse ACT process that coverts residuals at YCgCo domain obtained from inverse transform to residuals at RGB domain. The residuals at RGB domain obtained after the conversion is the residual information to be combined with the prediction information for reconstructing the current CB.

The first group of embodiments addresses the problem of signaling redundancy among ACT and BDPCM. Specifically, in VVC, at the sequence level, a BDPCM enable flag is signalled in the SPS; this flag is signalled only if the transform skip mode is enabled in the SPS.

When BDPCM is enabled, a flag is transmitted at the CU level if the CU size is smaller than or equal to MaxTsSize by MaxTsSize in terms of luma samples and if the CU is intra coded, where MaxTsSize is the maximum block size for which the transform skip mode is allowed. This flag indicates whether regular intra coding or BDPCM is used. If BDPCM is used, a BDPCM prediction direction flag is transmitted to indicate whether the prediction is horizontal or vertical. Then, the block is predicted using the regular horizontal or vertical intra prediction process with unfiltered reference samples. The residual is quantized and the difference between each quantized residual and its predictor, i.e. the previously coded residual of the horizontal or vertical (depending on the BDPCM prediction direction) neighbouring position, is coded.

For a block of size M (height)×N (width), let $r_{i,j}$, $0 \leq i \leq M-1$, $0 \leq j \leq N-1$ be the prediction residual. Let $Q(r_{i,j})$, $0 \leq i \leq M-1$, $0 \leq j \leq N-1$ denote the quantized version of the residual $r_{i,j}$. BDPCM is applied to the quantized residual values, resulting in a modified M×N array $\tilde{R}$ with elements $\tilde{r}_{i,j}$, where $\tilde{r}_{i,j}$ is predicted from its neighboring quantized residual value. For vertical BDPCM prediction mode, for $0 \leq j \leq (N-1)$, the following is used to derive $\tilde{r}_{i,j}$:

$$\tilde{r}_{i,j} = \begin{cases} Q(r_{i,j}), & i = 0 \\ Q(r_{i,j}) - Q(r_{(i-1),j}), & 1 \leq i \leq (M-1) \end{cases}$$

For horizontal BDPCM prediction mode, for $0 \leq i \leq (M-1)$, the following is used to derive $\tilde{r}_{i,j}$:

$$\tilde{r}_{i,j} = \begin{cases} Q(r_{i,j}), & j = 0 \\ Q(r_{i,j}) - Q(r_{i,(j-1)}), & 1 \leq j \leq (N-1) \end{cases}$$

At the decoder side, the above process is reversed to compute $Q(r_{i,j})$, $0 \leq i \leq M-1$, $0 \leq j \leq N-1$, as follows:

$Q(r_{i,j}) = \Sigma_{k=0}^{i} \tilde{r}_{k,j}$, if vertical BDPCM is used $Q(r_{i,j}) = \Sigma_{k=0}^{j} \tilde{r}_{i,k}$, if horizontal BDPCM is used The inverse quantized residuals, $Q^{-1}(Q(r_{i,j}))$, are added to the intra block prediction values to produce the reconstructed sample values.

The predicted quantized residual values $\tilde{r}_{i,j}$ are sent to the decoder using the same residual coding process as that in transform skip mode residual coding. In terms of the MPM mode for future intra mode coding, horizontal or vertical prediction mode is stored for a BDPCM-coded CU if the BDPCM prediction direction is horizontal or vertical, respectively. For deblocking, if both blocks on the sides of a block boundary are coded using BDPCM, then that particular block boundary is not deblocked.

Table 1 also includes coding unit syntax related to BDPCM at block level. As can be seen in Table 1, at CU level, when ACT is applied to current CU, BDPCM chroma is not applied. Decoding for BDPCM may occur only when ACT is not enabled. The BDPCM chroma related semantics in accordance with Table 1 are as follows:

sps_bdpcm_enabled_flag equal to 1 specifies that intra_bdpcm_luma_flag and intra_bdpcm_chroma_flag could be present in the coding unit syntax for intra coding units. sps_bdpcm_enabled_flag equal to 0 specifies that intra_bdpcm_luma_flag and intra_bdpcm_chroma_flag are not present in the coding unit syntax for intra coding units. When not present, the value of sps_bdpcm_enabled_flag is inferred to be equal to 0.

sps_bdpcm_chroma_enabled_flag equal to 1 specifies that intra_bdpcm_chroma_flag may be present in the coding unit syntax for intra coding units. sps_bdpcm_chroma_enabled_flag equal to 0 specifies that intra_bdpcm_chroma_flag is not present in the coding unit syntax for intra coding units. When not present, the value of sps_bdpcm_chroma_enabled_flag is inferred to be equal to 0.

intra_bdpcm_chroma_flag equal to 1 specifies that BDPCM is applied to the current chroma coding blocks at the location (x0, y0), i.e. the transform is skipped, the chroma intra prediction mode is specified by intra_bdpcm_chroma_dir_flag. intra_bdpcm_chroma_flag equal to 0 specifies that BDPCM is not applied to the current chroma coding blocks at the location (x0, y0). When intra_bdpcm_chroma_flag is not present it is inferred to be equal to 0.

intra_bdpcm_chroma_dir_flag equal to 0 specifies that the BDPCM prediction direction is horizontal. intra_bdpcm_chroma_dir_flag equal to 1 specifies that the BDPCM prediction direction is vertical.

Here, sps_bdpcm_chroma_enabled_flag is a sample-level BDPCM chroma enabling flag, and intra_bdpcm_ chroma_flag is a block-level BDPCM enabling flag. It can be understood that the sample-level BDPCM chroma enabling flag may be included in SPS as shown in Table 1, and may be an enabling flag at another level higher than the block level, such as a slice level flag, a tile group level flag, etc.

It can be learned from the coding unit syntax that ACT and BDPCM chroma cannot applied to CU at the same time. However, higher level flag of ACT and BDPCM chroma are always signaled in VVC. To remove signaling redundancy at sample-level for ACT and BDPCM, the first group of embodiments provides a mechanism to ensure that ACT and BDPCM chroma cannot be used simultaneously at a level higher than block level, such as sequence level, slice level, tile group level, etc.

In one embodiment of the first group of embodiments, the sample-level signaling of ACT flag (i.e., a sample-level ACT enabling flag) is done before BDPCM chroma flag at the same level (i.e., a sample-level BDPCM chroma enabling flag), and the sample-level BDPCM chroma enabling flag is signaled depending on a value of the sample-level ACT enabling flag. The sample-level BDPCM chroma enabling flag may be configured to specify whether a block-level BDPCM chroma enabling flag (e.g., intra_bdpcm_chroma_flag) could be present in the coding unit syntax for intra coding units belonging to the sample level. When ACT is signaled to be enabled (e.g., the sample-level ACT enabling flag is 1), the sample-level BDPCM chroma enabling flag is not signaled and is inferred to be 0; otherwise, when ACT is signaled to be disabled (e.g., the sample-level ACT enabling flag is 0), the sample-level BDPCM chroma enabling flag is signaled.

In other words, the control signal in this embodiment is the sample-level ACT enabling flag. The control signal conditionally restricts the decoder from performing BDPCM to chroma coding blocks belonging to the sample level. Specifically, when the value of the sample-level ACT enabling flag is 0, the signaling information includes a sample-level BDPCM chroma enabling flag (e.g., sps_bdpcm_chroma_enabled_flag) indicating whether BDPCM is applied to at least one chroma coding block belonging to the sample level; and when a value of the sample-level BDPCM chroma enabling flag is 1, the signaling information further includes a block-level BDPCM chroma enabling flag (e.g., intra_bdpcm_chroma_flag) indicating whether BDPCM is applied to chroma components of the current CU. When a value of the block-level BDPCM chroma enabling flag is 1, inverse quantized residuals based on a BDPCM prediction direction indicated by the signaling information (e.g., the signaling information includes intra_bdpcm_chroma_dir_flag) are determined by the decoder as the residual information and an inverse transform process is skipped.

In one example, a modified sequence parameter syntax in accordance with the above embodiment is described in Table 2.

TABLE 2

| Modified sequence parameter set RBSP syntax | Descriptor |
|---|---|
| seq_parameter_set_rbsp( ) { | |
| ... | |
| sps_bdpcm_enabled_flag | u(1) |
| ... | |

TABLE 2-continued

| Modified sequence parameter set RBSP syntax | Descriptor |
|---|---|
| if( chromaArrayType = = 3 ) { | |
| ... | |
| sps_act_enabled_flag | u(1) |
| if (sps_bdpcm_enabled_flag && !sps_act_enabled_flag) | |
| sps_bdpcm_chroma_enabled_flag | u(1) |
| } | |
| ... | |
| } | |

As described in Table 2, in sequence parameter set, the sample-level ACT enabling flag sps_act_enabled_flag is signaled first to specify that ACT may be used, and then the sample-level BDPCM chroma enabling flag sps_bdpcm_chroma_enabled_flag is signaled only when sps_bdpcm_enabled_flag is 1 and the sample-level ACT enabling flag sps_act_enabled_flag is 0. When sps_bdpcm_enabled_flag is 0 or the sample-level ACT enabling flag sps_act_enabled_flag is 1, the sample-level BDPCM chroma enabling flag sps_bdpcm_chroma_enabled_flag is not signaled (i.e., not included in the signaling information), and is inferred to be 0.

In another embodiment of the first group of embodiments, the sample-level signaling of BDPCM chroma flag (i.e., the sample-level BDPCM chroma enabling flag) is done before ACT flag at the same level (i.e., the sample-level ACT enabling flag), and the sample-level ACT enabling flag is signaled depending on the value of the sample-level BDPCM chroma enabling flag. When BDPCM chroma is signaled to be enabled at the sample level (e.g., the sample-level BDPCM chroma enabling flag is 1), the sample-level ACT enabling flag is not signaled and is inferred to be 0; otherwise, when BDPCM chroma is signaled to be disabled level (e.g., the sample-level BDPCM chroma enabling flag is 0), the sample-level ACT enabling flag is signaled.

In other words, the control signal in this embodiment is the sample-level BDPCM chroma enabling flag. The control signal conditionally restricts the decoder from performing ACT to the current CU belonging to the sample level. Specifically, when the value of the sample-level BDPCM chroma enabling flag is 0, the signaling information includes a sample-level ACT flag indicating whether ACT is applied to at least one coding block belonging to the sample level; when the value of the sample-level ACT enabling flag is 1, the ACT enablement information further includes a block-level ACT enabling flag indicating whether ACT is used for the current CU. Alternatively, when a value of the sample-level BDPCM chroma enabling flag is 1, the signaling information does not include the sample-level ACT enabling flag, and a value of the sample-level ACT enabling flag is inferred to be 0. Further, the signaling information does not include the block-level ACT enabling flag, and the value of the block-level ACT enabling flag of the current CU is inferred to be 0. The signaling information further includes a block-level BDPCM chroma enabling flag indicating whether BDPCM is applied to chroma components of the current CU, and when a value of the block-level BDPCM chroma enabling flag is 1, inverse quantized residuals based on a BDPCM prediction direction indicated by the signaling information (e.g., the signaling information includes intra_bdpcm_chroma_dir_flag) are determined by the decoder as the residual information and an inverse transform process is skipped.

In one example, a modified sequence parameter syntax in accordance with the above embodiment is described in Table 3.

TABLE 3

Modified sequence parameter set RBSP syntax

| | Descriptor |
|---|---|
| seq_parameter_set_rbsp( ) { | |
| ... | |
| sps_bdpcm_enabled_flag | u(1) |
| ... | |
| if( chromaArrayType = = 3 ) { | |
| ... | |
| if (sps_bdpcm_enabled_flag) | |
| sps_bdpcm_chroma_enabled_flag | u(1) |
| if ( ! sps_bdpcm_chroma_enabled_flag) | |
| sps_act_enabled_flag | u(1) |
| } | |
| ... | |
| } | |

As described in Table 3, in the sequence parameter set modified from VVC draft 7, the sample-level BDPCM chroma enabling flag sps_bdpcm_chroma_enabled_flag is signaled first to specify that BDPCM may be used for chroma components. The sample-level ACT enabling flag sps_act_enabled_flag is signaled only when the sample-level BDPCM chroma enabling flag sps_bdpcm_chroma_enabled_flag is 0. When the sample-level BDPCM chroma enabling flag sps_bdpcm_chroma_enabled_flag is 1, the sample-level ACT enabling flag sps_act_enabled_flag is not signaled, and is inferred to be 0.

As such, the first group of embodiments removes signaling redundancy among ACT and BDPCM at a sample level higher than the block level, which may occupy two bits in the signaling information. The first group of embodiments can save one bit in the signaling information (e.g., SPS) of the coded bitstream.

The second group of embodiments addresses an overlap between the two coding tools: ACT and Joint Cb Cr Residual (JCCR) coding, which are both used to remove inter-component dependency among residuals.

VVC supports a mode JCCR (Joint Cb Cr Residual coding) where the chroma residuals are coded jointly. The usage (activation) of a joint chroma coding mode is indicated by a TU-level flag (also referred as a block-level flag) tu_joint_cbcr_residual_flag and the selected mode is implicitly indicated by the chroma CBFs (coded block flags). The flag tu_joint_cbcr_residual_flag is present if either or both chroma CBFs for a TU are equal to 1. In the PPS and slice header, chroma QP offset values are signalled for the joint chroma residual coding mode to differentiate from the chroma QP offset values signalled for regular chroma residual coding mode. These chroma QP offset values are used to derive the chroma QP values for those blocks coded using the joint chroma residual coding mode. When a corresponding joint chroma coding mode (modes 2 in Table 4) is active in a TU, this chroma QP offset is added to the applied luma-derived chroma QP during quantization and decoding of that TU. For the other modes (modes 1 and 3 in Table 4), the chroma QPs are derived in the same way as for conventional Cb or Cr blocks. The reconstruction process of the chroma residuals (resCb and resCr) from the transmitted transform blocks is depicted in Table 4. When this mode is activated, one single joint chroma residual block (resJointC [x][y] in Table 4) is signalled, and residual block for Cb (resCb) and residual block for Cr (resCr) are derived considering information such as tu_cbf_cb, tu_cbf_cr, and CSign, which is a sign value specified in the slice header.

TABLE 4

Reconstruction of chroma residuals.
The value CSign is a sign value (+1 or −1), which is specified in the slice header, resJointC[ ][ ] is the transmitted residual.

| tu_cbf_cb | tu_cbf_cr | reconstruction of Cb and Cr residuals | mode |
|---|---|---|---|
| 1 | 0 | resCb[ x ][ y ] = resJointC[ x ][ y ]<br>resCr[ x ][ y ] = ( CSign * resJointC[ x ][ y ] ) >> 1 | 1 |
| 1 | 1 | resCb[ x ][ y ] = resJointC[ x ][ y ]<br>resCr[ x ][ y ] = CSign * resJointC[ x ][ y ] | 2 |
| 0 | 1 | resCb[ x ][ y ] = ( CSign * resJointC[ x ][ y ] ) >> 1<br>resCr[ x ][ y ] = resJointC[ x ][ y ] | 3 |

The three joint chroma coding modes described above are only supported in intra coded CU. In inter-coded CU, only mode 2 is supported. Hence, for inter coded CU, the syntax element tu_joint_cbcr_residual_flag is only present if both chroma cbfs are 1.

The related spec text of JCCR mode in VVC draft version 6 is described in Table 5.

TABLE 5

Transform unit syntax

| | Descriptor |
|---|---|
| transform_unit( x0, y0, tbWidth, tbHeight, treeType, subTuIndex ) { | |
|   if( ( treeType = = SINGLE_TREE \|\| treeType = = DUAL_TREE_CHROMA ) && | |
|     ChromaArrayType != 0 ) { | |
|     if( ( IntraSubPartitionsSplitType = = ISP_NO_SPLIT && !( cu_sbt_flag && | |
|       ( ( subTuIndex = = 0 && cu_sbt_pos_flag ) \|\| | |
|       ( subTuIndex = = 1 && !cu_sbt_pos_flag ) ) ) ) \|\| | |
|     ( IntraSubPartitionsSplitType != ISP_NO_SPLIT && | |
|       ( subTuIndex = = NumIntraSubPartitions − 1 ) ) ) { | |
|       tu_cbf_cb[ x0 ][ y0 ] | ae(v) |
|       tu_cbf_cr[ x0 ][ y0 ] | ae(v) |
|     } | |
|   } | |
|   if( treeType = = SINGLE_TREE \|\| treeType = = DUAL_TREE_LUMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \|\| | |
|       ( subTuIndex = = 1 && !cu_sbt_pos_flag ) ) ) && | |
|     ( CuPredMode[ x0 ][y0 ] = = MODE _INTRA \|\| | |
|       tu_cbf_cb[ x0 ][ y0 ] \|\| tu_cbf_cr[ x0 ][ y0 ] \|\| | |

TABLE 5-continued

Transform unit syntax

| | Descriptor |
|---|---|
|       CbWidth[ x0 ][ y0 ] > MaxTbSizeY \|\| CbHeight[ x0 ][ y0 ] > MaxTbSizeY ) ) \|\|<br>    ( IntraSubPartitionsSplitType != ISP_NO_SPLIT &&<br>    ( subTuIndex < NumIntraSubPartitions − 1 \|\| !InferTuCbfLuma ) ) )<br>      tu_cbf_luma[ x0 ][ y0 ] | ae(v) |
|    if (IntraSubPartitionsSplitType != ISP_NO_SPLIT )<br>     InferTuCbfLuma = InferTuCbfLuma && !tu_cbf_luma[ x0 ][ y0 ]<br>  }<br>  if( IntraSubPartitionsSplitType != ISP_NO_SPLIT &&<br>    treeType = = SINGLE_TREE && subTuIndex = = NumIntraSubPartitions − 1 ) )<br>    xC = CbPosX[ x0 ][ y0 ]<br>    yC = CbPosY[ x0 ][ y0 ]<br>    wC = CbWidth[ x0 ][ y0 ] / SubWidthC<br>    hC = CbHeight[ x0 ][ y0 ] / SubHeightC<br>  } else<br>    xC = x0<br>    yC = y0<br>    wC = tbWidth / SubWidthC<br>    hC = tbHeight / SubHeightC<br>  }<br>  if( ( tu_cbf_luma[ x0 ][ y0 ] \|\| tu_cbf_cb[ x0 ][ y0 ] \|\| tu_cbf_cr[ x0 ][ y0 ] ) &&<br>    treeType != DUAL_TREE_CHROMA ) {<br>    if( cu_qp_delta_enabled_flag && !IsCuQpDeltaCoded ) {<br>      cu_qp_delta_abs | ae(v) |
|       if( cu_qp_delta_abs )<br>        cu_qp_delta_sign_flag | ae(v) |
|     }<br>  }<br>  if( sps_joint_cbcr_enabled_flag && ( ( CuPredMode[ x0 ][y0 ] = = MODE_INTRA &&<br>    ( tu_cbf_cb[ x0 ][ y0 ] \|\| tu_cbf_cr[ x0 ][ y0 ] ) ) \|\|<br>    ( tu_cbf_cb[ x0 ][ y0 ] && tu_cbf_cr[ x0 ][ y0 ] ) ) )<br>    tu_joint_cbcr_residual_flag[ x0 ][ y0 ] | ae(v) |
|   if( tu_cbf_luma[ x0 ][ y0 ] && treeType != DUAL_TREE_CHROMA<br>    && ( tbWidth <= 32 ) && ( tbHeight <= 32 )<br>    && ( IntraSubPartitionsSplit[ x0 ][ y0 ] = = ISP_NO_SPLIT ) && ( !cu_sbt_flag ) )<br>{<br>    if( sps_transform_skip_enabled_flag && !BdpcmFlag[ x0 ][ y0 ] &&<br>      tbWidth <= MaxTsSize && tbHeight <= MaxTsSize )<br>      transform_skip_flag[ x0 ][y0 ] | ae(v) |
|     if( ( ( CuPredMode[ x0 ][ y0 ] = = MODE_INTER &&<br>sps_explicit_mts_inter_enabled_flag )<br>      \|\| ( CuPredMode[ x0 ][ y0 ] = = MODE_INTRA &&<br>sps_explicit_mts_intra_enabled_flag ) )<br>      && ( !transform_skip_flag[ x0 ][ y0 ] ) )<br>      tu_mts_idx[ x0 ][ y0 ] | ae(v) |
|   }<br>  if( tu_cbf_luma[ x0 ][y0 ] ) {<br>    if( !transform_skip_flag[ x0 ][ y0 ] )<br>      residual_coding( x0, y0, Log2( tbWidth ), Log2( tbHeight ), 0 )<br>    else<br>      residual_ts_coding( x0, y0, Log2( tbWidth ), Log2( tbHeight ), 0 )<br>  }<br>  if( tu_cbf_cb[ x0 ][ y0 ] )<br>    residual_coding( xC, yC, Log2( wC ), Log2( hC ), 1 )<br>  if( tu_cbf_cr[ x0 ][ y0 ] &&<br>    !( tu_cbf_cb[ x0 ][ y0 ] && tu_joint_cbcr_residual_flag[ x0 ][ y0 ] )) {<br>    residual_coding( xC, yC, Log2( wC ), Log2( hC ), 2 )<br>  }<br>} | |

JCCR related semantics are described as following.

sps_joint_cbcr_enabled_flag equal to 0 specifies that the joint coding of chroma residuals is disabled. sps_joint_cbcr_enabled_flag equal to 1 specifies that the joint coding of chroma residuals is enabled.

tu_joint_cbcr_residual_flag[x0][y0] specifies whether the residual samples for both chroma components Cb and Cr are coded as a single transform block. The array indices x0, y0 specify the location (x0, y0) of the top-left luma sample of the considered transform block relative to the top-left luma sample of the picture.

tu_joint_cbcr_residual_flag[x0][y0] equal to 1 specifies that the transform unit syntax includes the transform coefficient levels for a single transform block from which the residual samples for both Cb and Cr are derived. tu_joint_cbcr_residual_flag[x0][y0] equal to 0 specifies that the transform coefficient levels of the chroma components are coded as indicated by the syntax elements tu_cbf_cb[x0][y0] and tu_cbf_cr[x0][y0].

When tu_joint_cbcr_residual_flag[x0][y0] is not present, it is inferred to be equal to 0.

Depending on tu_joint_cbcr_residual_flag[x0][y0], tu_cbf_cb[x0][y0], and tu_cbf_cr[x0][y0], the variable TuCResMode[x0][y0] is derived as follows:

If tu_joint_cbcr_residual_flag[x0][y0] is equal to 0, the variable TuCResMode[x0][y0] is set equal to 0;

Otherwise, if tu_cbf_cb[x0][y0] is equal to 1 and tu_cbf_cr[x0][y0] is equal to 0, the variable TuCResMode[x0][y0] is set equal to 1;

Otherwise, if tu_cbf_cb[x0][y0] is equal to 1, the variable TuCResMode[x0][y0] is set equal to 2;

Otherwise, the variable TuCResMode[x0][y0] is set equal to 3.

In a scaling and transformation process, inputs to this process are:

a luma location (xTbY, yTbY) specifying the top-left sample of the current luma transform block relative to the top-left luma sample of the current picture, a variable cIdx specifying the colour component of the current block, a variable nTbW specifying the transform block width, a variable nTbH specifying the transform block height.

Outputs of the scaling and transformation process is the (nTbW)×(nTbH) array of residual samples resSamples[x][y] with x=0 . . . nTbW−1, y=0 . . . nTbH−1.

The variables bitDepth, bdShift and tsShift are derived as follows:

bitDepth=(cIdx==0)?BitDepth$_Y$:BitDepth$_C$ bdShift=Max(22−bitDepth, 0)

tsShift=5+((Log 2(nTbW)+Log 2(nTbH))/2)

The variable codedCIdx is derived as follows:

If cIdx is equal to 0 or TuCResMode[xTbY][yTbY] is equal to 0, codedCIdx is set equal to cIdx.

Otherwise, if TuCResMode[xTbY][yTbY] is equal to 1 or 2, codedCIdx is set equal to 1.

Otherwise, codedCIdx is set equal to 2.

The variable cSign is set equal to (1−2*slice_joint_cbcr_sign_flag).

The (nTbW)×(nTbH) array of residual samples resSamples is derived as follows:

1. The scaling process for transform coefficients is invoked with the transform block location (xTbY, yTbY), the transform width nTbW and the transform height nTbH, the colour component variable cIdx and the bit depth of the current colour component bitDepth as inputs, and the output is an (nTbW)×(nTbH) array of scaled transform coefficients d.

2. The (nTbW)×(nTbH) array of residual samples r is derived as follows:

If transform_skip_flag[xTbY][yTbY][cIdx] is equal to 1, the residual sample array values r[x][y] with with x=0 . . . nTbW−1, y=0 . . . nTbH−1 are derived as follows:

r[x][y]=d[x][y]<<tsShift

Otherwise (transform_skip_flag[xTbY][yTbY][cIdx] is equal to 0), the transformation process for scaled transform coefficients is invoked with the transform block location (xTbY, yTbY), the transform width nTbW and the transform height nTbH, the colour component variable cIdx and the (nTbW)×(nTbH) array of scaled transform coefficients d as inputs, and the output is an (nTbW)×(nTbH) array of residual samples r.

3. The residual samples resSamples[x][y] with x=0 . . . nTbW−1, y=0 . . . nTbH−1 are derived as follows:

resSamples[x][y]=(r[x][y]+(1<<(bdShift−1)))>>bdShift

4. The residual samples resSamples[x][y] with x=0 . . . nTbW−1, y=0 . . . nTbH−1 are derived as follows:

If cIdx is equal to codedCIdx, the following applies:

resSamples[x][y]=res[x][y]

Otherwise, if TuCResMode[xTbY][yTbY] is equal to 2, the following applies:

resSamples[x][y]=cSign*res[x][y]

Otherwise, the following applies:

resSamples[x][y]=(cSign*res[x][y])>>1

In a binarization process, input to this process is a request for a syntax element. Output of this process is the binarization of the syntax element. Table 6 specifies the type of binarization process associated with each syntax element and corresponding inputs.

TABLE 6

Syntax elements and associated binarization

| Syntax structure | Syntax element | Process | Input parameters |
|---|---|---|---|
| transform_unit( ) | tu_cbf_luma[ ][ ][ ] | FL | cMax = 1 |
| | tu_cbf_cb[ ][ ][ ] | FL | cMax = 1 |
| | tu_cbf_cr[ ][ ][ ] | FL | cMax = 1 |
| | cu_qp_delta_abs | 9.3.3.10 | — |
| | cu_qp_delta_sign_flag | FL | cMax = 1 |
| | cu_chroma_qp_offset_flag | FL | cMax = 1 |
| | cu_chroma_qp_offset_idx | TR | cMax = chroma_qp_offset_list_len_minus1, cRiceParam = 0 |
| | transform_skip_flag[ ][ ] | FL | cMax = 1 |
| | tu_mts_idx[ ][ ] | TR | cMax = 4, cRiceParam = 0 |
| | tu_joint_cbcr_residual_flag[ ][ ] | FL | cMax = 1 |

In a derivation process for ctxTable, ctxIdx and bypass-Flag, input to this process is the position of the current bin within the bin string, binIdx. Outputs of this process are ctxTable, ctxIdx and bypassFlag. Table 7 includes assignment of ctxInc to syntax elements with context coded bins.

TABLE 7 assignment of ctxInc to syntax elements with context coded bins

| Syntax element | binIdx 0 | 1 | 2 | 3 | 4 | >=5 |
|---|---|---|---|---|---|---|
| bcw_idx[ ][ ] NoBackwardPredFlag == 1 | 0 | bypass | bypass | bypass | na | na |
| cu_cbf | 0 | na | na | na | na | na |
| cu_sbt_flag | (cbWidth * cbHeight < 256) ? 1:0 | na | na | na | na | na |
| cu_sbt_quad_flag | 0 | na | na | na | na | na |
| cu_sbt_horizontal_flag | (cbWidth == cbHeight) ? 0: (cbWidth < cbHeight) ? 1:2 | na | na | na | na | na |
| cu_sbt_pos_flag | 0 | na | na | na | na | na |
| lfnst_idx[ ][ ] | (tu_mts_idx[x0][y0] == 0 && treeType != SINGLE_TREE) ? 1:0 | bypass | na | na | na | na |
| abs_mvd_greater0_flag[ ] | 0 | na | na | na | na | na |
| abs_mvd_greater1_flag[ ] | 0 | na | na | na | na | na |
| abs_mvd_minus2[ ] | bypass | bypass | bypass | bypass | bypass | bypass |
| mvd_sign_flag[ ] | bypass | na | na | na | na | na |
| tu_cbf_luma[ ][ ][ ] | 0, 1, 2, 3 (clause 9.3.4.2.5) | na | na | na | na | na |
| tu_cbf_cb[ ][ ][ ] | 0 | na | na | na | na | na |
| tu_cbf_cr[ ][ ][ ] | tu_cbf_cb[ ][ ][ ] | na | na | na | na | na |
| cu_qp_delta_abs | 0 | 1 | 1 | 1 | 1 | bypass |
| cu_qp_delta_sign_flag | bypass | na | na | na | na | na |
| cu_chroma_qp_offset_flag | 0 | na | na | na | na | na |
| cu_chroma_qp_offset_idx | 0 | 0 | 0 | 0 | 0 | na |
| transform_skip_flag[ ][ ] | 0 | na | na | na | na | na |
| tu_mts_idx[ ][ ] | 0 | 1 | 2 | 3 | na | na |
| tu_joint_cbcr_residual_flag[ ][ ] | 2*tu_cbf_cb[ ][ ] + tu_cbf_cr[ ][ ] − 1 | na | na | na | na | na |

Here, sps_joint_cbcr_enabled_flag is a sample-level JCCR enabling flag at sequence level, and tu_joint_cbcr_residual_flag a block-level JCCR flag. It can be understood that a sample-level JCCR enabling flag may be directed to at another level higher than the block level, such as a slice level flag, a tile group level flag, etc.

It can be seen from the semantics related to ACT and JCCR that there is an overlap between these two coding tools, which are both used to remove inter-component dependency among residuals. Specifically, if ACT is performed, the residuals at YCgCo domain are already decor-related and there is no need to perform JCCR coding.

In some embodiments of the second group of embodiments, a mechanism is provided to ensure that ACT and JCCR cannot be used simultaneously at a level higher than block level, such as sequence level, slice level, tile group level, etc.

In one embodiment, the sample-level signaling of ACT flag (i.e., a sample-level ACT enabling flag) is done before JCCR flag at the same level (i.e., a sample-level JCCR enabling flag), and the sample-level JCCR enabling flag is signaled depending on a value of the sample-level ACT enabling flag. When ACT is signaled to be enabled (e.g., the sample-level ACT enabling flag is 1), the sample-level JCCR enabling flag at the same level is not signaled and is inferred to be 0; otherwise, when ACT is signaled to be disabled (e.g., the sample-level ACT enabling flag is 0), the sample-level JCCR enabling flag is signaled (i.e., included in the signaling information).

In other words, the control signal in this embodiment is the sample-level ACT enabling flag. The control signal conditionally restricts the decoder from performing JCCR to obtain residuals for CUs belonging to the sample level. Specifically, when the value of the sample-level ACT enabling flag (e.g., sps_act_enabled_flag) is 0, the signaling information includes the sample-level JCCR enabling flag (e.g., sps_joint_cbcr_enabled_flag) indicating whether joint coding of chroma residuals is enabled for at least one CU belonging to the sample level; and when a value of the sample-level JCCR enabling flag is 1, the signaling information further includes a block-level JCCR flag (e.g., tu_joint_cbcr_residual_flag) indicating whether residuals for both chroma components Cb and Cr are coded as a single transform block corresponding to the current CU. When a value of the block-level JCCR flag is 1, the residual information of the current CU is determined by deriving the residuals for the chroma components Cb and Cr according to transform coefficients of the single transform block.

In another embodiment, the sample-level signaling of JCCR flag (i.e., a sample-level JCCR enabling flag) is done before ACT flag at the same level (i.e., a sample-level ACT enabling flag), and the sample-level ACT enabling flag is signaled depending on the value of sample-level JCCR enabling flag. When JCCR is signaled to be enabled (e.g., the sample-level JCCR enabling flag is 1), the sample-level ACT flag is not signaled at the same level and is inferred to be 0; otherwise, when JCCR flag signaled to be disabled (e.g., the sample-level JCCR enabling flag is 0), the sample-level ACT flag is signaled (i.e., included in the signaling information).

In other words, the control signal in this embodiment is the sample-level JCCR enabling flag. The control signal conditionally restricts the decoder from performing ACT to the current CU belonging to the sample level. Specifically, when the value of the sample-level JCCR enabling flag is 0, the signaling information includes a sample-level ACT flag indicating whether ACT is applied to at least one coding block belonging to the sample level; when the value of the sample-level ACT enabling flag is 1, the ACT enablement information further includes a block-level ACT enabling flag indicating whether ACT is used for the current CU. Alternatively, when a value of the sample-level JCCR enabling flag is 1, the signaling information does not include the sample-level ACT enabling flag, and a value of the sample-level ACT enabling flag is inferred to be 0. Further, the signaling information does not include the block-level ACT enabling flag, and the value of the block-level ACT enabling flag of the current CU is inferred to be 0. The signaling information further includes a block-level JCCR flag indicating whether residuals for both chroma components Cb and Cr are coded as a single transform block corresponding to the current CU, and when a value of the block-level JCCR flag is 1, the residual information of the current CU is determined by deriving the residuals for the chroma components Cb and Cr according to transform coefficients of the single transform block.

In some embodiments of the second group of embodiments, a mechanism is provided to ensure that adaptive color transform and JCCR cannot be used simultaneously for a block.

In one embodiment, ACT is signaled before JCCR at block level. That is, a block-level ACT enabling flag is signaled before a block-level JCCR flag. When ACT is signaled as on (i.e., the block-level ACT enabling flag being 1), JCCR is not signaled and inferred as off (e.g., the signaling information does not include the block-level JCCR flag).

In other words, the control signal in this embodiment is the block-level ACT enabling flag (e.g., cu_act_enabled_flag). The control signal conditionally restricts the decoder from performing JCCR decoding for residuals of the current CU. When a value of the block-level ACT enabling flag is 1, the block-level JCCR flag (e.g., tu_joint_cbcr_residual_flag) indicating whether residual samples for both chroma components CU and Cr are jointly coded as a single transform block for the current CU is not included in the signaling information and is inferred to be 0. Further, the value of the block-level ACT enabling flag being 0 is one of multiple conditions that need to be satisfied before including the block-level JCCR flag in the signaling information.

In one example, the syntax table may be shown as Table 8. Comparing to the syntax in VVC draft as described in Table 5, "&& !cu_act_enabled_flag" is added as an additional condition required to signal the block-level JCCR flag tu_joint_cbcr_residual_flag[xC][yC].

TABLE 8

| Modified transform unit syntax | Descriptor |
|---|---|
| transform_unit( x0, y0, tbWidth, tbHeight, treeType, subTuIndex, chType ) { <br> ...... <br>   if( ( CbWidth[ chType ][ x0 ][ y0 ] > 64 \|\| CbHeight[ chType ][ x0 ][ y0 ] > 64 \|\| <br>     ( chromaAvailable && ( tu_cbf_cb[ xC ][ yC ] \|\| tu_cbf_cr[ xC ][ yC ] ) ) ) && <br>     treeType != DUAL_TREE_LUMA ) { <br>     if( cu_chroma_qp_offset_enabled_flag && !IsCuChromaQpOffsetCoded) { <br>       cu_chroma_qp_offset_flag <br>       if( cu_chroma_qp_offset_flag && chroma_qp_offset_list_len_minus1 > 0 ) <br>         cu_chroma_qp_offset_idx <br>     } <br>   } <br>   if( sps_joint_cbcr_enabled_flag && ( ( CuPredMode[ chType ][ x0 ][y0 ] = = MODE_INTRA <br>     && ( tu_cbf_cb[ xC ][ yC ] \|\| tu_cbf_cr[ xC ][ yC ] ) ) \|\| <br>     ( tu_cbf_cb[ xC ][ yC ] && tu_cbf_cr[ xC ][ yC ] ) ) && chromaAvailable <br>     && !cu_act_enabled_flag) <br>     tu_joint_cbcr_residual_flag[ xC ][ yC ] <br> ...... <br> } | <br><br><br><br><br>ae(v)<br><br>ae(v)<br><br><br><br><br><br><br>ae(v) |

In another embodiment, JCCR is signaled before ACT at block level. That is, a block-level JCCR flag is signaled before a block-level ACT enabling flag. When JCCR is signaled as on (i.e., the block-level JCCR flag being 1), ACT is not signaled and inferred as off (e.g., the signaling information does not include the block-level ACT enabling flag).

In other words, the control signal in this embodiment is the block-level JCCR flag (e.g., tu_joint_cbcr_residual_flag). The control signal conditionally restricts the decoder from performing ACT for the current CU. When a value of the block-level JCCR flag is 1, the block-level ACT flag (e.g., cu_act_enabled_flag) is not included in the signaling information and is inferred to be 0. Further, the value of the block-level JCCR flag being 0 is one of multiple conditions that need to be satisfied before including the block-level ACT enabling flag in the signaling information.

In some embodiments of the second group of embodiments, ACT flag (e.g., cu_act_enabled_flag) of a block is used as additional contexts to entropy code the JCCR flag (e.g., tu_joint_cbcr_residual_flag). That is, the signaling information may include a block-level JCCR flag entropy coded using the block-level ACT enabling flag as a context.

In one example, a new set of contexts for JCCR flag signaling are added so that two sets of contexts are used for the cases of color transform on and off, respectively. That is, two sets of contexts associated with the block-level ACT enabling flag are added to a context model for entropy coding the block-level JCCR flag, including a first set of contexts corresponding to the block-level ACT enabling flag indicating ACT is used for the current CU and a second set of contexts corresponding to the block-level ACT enabling flag indicating ACT is not used for the current CU.

In some embodiments of the second group of embodiments, during an encoding process, JCCR is only checked or evaluated at the encoder when ACT is off. That is, an encoder of the existing technology may check all possible combinations including: JCCR on and ACT on; JCCR off and ACT on; JCCR on and ACT off; and JCR off and ACT off. In this embodiment, the combination of JCCR on and ACT on is not checked by the encoder. Alternatively, ACT may be checked or evaluated only when JCCR is off.

As such, the second group of embodiments addresses overlapping color/chroma coding tools among ACT and JCCR, where enabling flag of one coding tool is used as the control signal for the other coding tool. In some embodiments, signaling/usage of one coding tool excludes signaling of the other coding tool, and the signaling information may be saved for one bit. In some embodiments, signaling of a first coding tool affects the context model of enabling flag of a second coding tool, where CABAC possibility is affected based on different status of the signal of the first coding tool. In some embodiments, encoding efficiency is improved by excluding one evaluation process based on flag status of the two coding tools.

The third group of embodiments address size limit for buffering decoded residual data. Specifically, before doing the ACT, all three color planes YCoCg should be decoded at the spatial domain. It means that three color buffers are needed before performing the ACT. If the supported coding blocks in ACT is M×N, the temporary buffer size is 3×M×N to buffer the decoded residual data of three planes. That is, the color transform may not be feasible when the maximum buffer size is reached but no space to buffer data in all YCoCg color planes.

Conditionally disabling the use of ACT at block level based on the size of the block can accommodate the maximum volume requirement of the buffer. That is, the control signal in the third group of embodiments may include block size threshold information. When a size of the current CU is larger than a size indicated by the block size threshold information, ACT is disabled for the current CU (e.g. a block-level ACT enabling flag is 0); and when a size of the current CU is not larger than the block size threshold information, determining that ACT is enabled for the current CU (e.g. a block-level ACT enabling flag is 1).

In one embodiment, the block size threshold information indicates a threshold of a number of pixels for a CU (e.g., pixels in luma block of the CU). That is, when the number of pixels in a block is larger (or no smaller) than the threshold, ACT is off for the block. For example, assuming that the buffer size is 64*64 and the number of pixels in the block is denoted as m*n, the threshold for the number of pixels may be no greater than 64*64/3.

In another embodiment, when block width is larger (or no smaller) than a first threshold and/or block height is larger (or no smaller) than a second threshold, ACT is off for the block. That is, the block size threshold information indicates at least one of a threshold of block width or a threshold of a block height for a CB. In one example, the threshold of block width and the threshold of block height may be identical.

Table 9 describes one embodiment on ACT size restriction based on the luma sample size of coded block. The ACT is disabled when the total luma sample size of the coded block is larger than X for a M×N coded block. The threshold value X is a predefined value. In the syntax, "&& cbWidth× cbHeight <=X" is added as additional condition to be satisfied before processing the block-level ACT flag cu_act_enabled_flag.

TABLE 9

| Modified coding unit syntax | |
|---|---|
| | Descriptor |
| coding_unit( x0, y0, cbWidth, cbHeight, cqtDepth, treeType, modeType ) { <br>   chType = treeType = = DUAL_TREE_CHROMA ? 1 : 0 <br>   ... <br>   If( CuPredMode[ chType ][ x0 ][ y0 ] = = MODE _INTRA && sps_act_enabled_flag && <br>     treeType = = SINGLE_TREE && cbWidth × cbHeight <= X ) <br>     cu_act_enabled_flag | ae(v) |
|   ... <br>   } else if( treeType != DUAL_TREE_CHROMA ) { /* MODE_INTER or MODE_IBC */ <br>     if( cu_skip_flag[ x0 ][ y0 ] = = 0 ) <br>       general_merge_flag[ x0 ][ y0 ] | ae(v) |
|     ... <br>   } <br>   if( CuPredMode[ chType ][ x0 ][ y0 ] != MODE_INTRA && !pred_mode_plt_flag && <br>     general_merge_flag[ x0 ][ y0 ] = = 0 ) <br>     cu_cbf <br>   if( cu_cbf ) { <br>     ... <br>     if( sps_act_enabled_flag && CuPredMode[ chType ][ x0 ][y0 ] != MODE_INTRA && <br>       treeType = = SINGLE_TREE ) <br>       cu_act_enabled_flag | ae(v) <br><br> ae(v) |
|       mts_idx <br>     ... <br>   } | ae(v) |

Based on Table 9, the "cbWidth×cbHeight" represents the total luma sample size of the coded block, where cbWidth is the block width and cbHeight is the block height. X represents a given predefined threshold value. For a buffer having a maximum capacity of 64*64, the threshold value for the pixel number may be a number smaller than 64*64/3, where 3 is the number of color channels in RGB format. In one example, X=64, and the ACT is disabled for a M×N coded block when the M×N value is larger than 64.

In some embodiments, the block size threshold information may be signaled in a bitstream, such as in SPS (sequence parameter set), PPS (picture parameter set), picture header, slice header, etc. Alternatively, the block size threshold information is written in the coding unit syntax as a constant.

In some embodiments, the block size threshold information includes a value derived from a block size threshold value using a conversion equation, a data length of the derived value being smaller than a data length of the block size threshold value.

For a M×N coded block, ACT is disabled when the total luma sample size of the coded block is larger than X for a M×N coded block. The value X may be derived from the following equation $$X=(1<<sps\_log\ 2\_act\_threshold\_minus4)+4$$

where "sps_log 2_act_threshold_minus4" is the derived value signaled in a bitstream, such as in SPS (sequence parameter set), PPS (picture parameter set), picture header, slice header, etc. The derived value occupies less bit in the signaling information than the actual size threshold value.

Table 10 shows an example of modified SPS syntax, where "if(sps_act_enable_flag){sps_log 2_act_threshold_minus4}" is added to signal the block size threshold information in SPS. Table 11 shows modified coding unit syntax in accordance with the example described in Table 10. As shown in Table 11, "&& cbWidth×cbHeight<=(1<<(sps_log 2_act_threshold_minus4+4)" is added as additional condition to be satisfied before processing the block-level ACT flag cu_act_enabled_flag.

TABLE 10

| modified SPS syntax | |
|---|---|
| if( chroma_format_idc = = 3 ) { | |
|    sps_palette_enabled_flag | u(1) |
|    sps_act_enabled_flag | u(1) |
| } | |
| if( sps_act_enable_flag ) { | |
|    sps_log2_act_threshold_minus4 | ue(v) |
| } | |

TABLE 11

| modified coding unit syntax | |
|---|---|
|  | Descriptor |
| coding_unit( x0, y0, cbWidth, cbHeight, cqtDepth, treeType, modeType ) { | |
|   chType = treeType = = DUAL_TREE_CHROMA ? 1 : 0 | |
|   ... | |
|   If( CuPredMode[ chType ][ x0 ][ y0 ] = = MODE_INTRA && sps_act_enabled_flag && treeType = = SINGLE_TREE && cbWidth x cbHeight <= (1<<(sps_log2_act_threshold_minus4+4)) ) | |
|     cu_act_enabled_flag | ae(v) |
|   ... | |
|   } else if( treeType != DUAL_TREE_CHROMA ) { /* MODE_INTER or MODE_IBC */ | |
|     if( cu_skip_flag[ x0 ][ y0 ] = = 0 ) | |
|       general_merge_flag[ x0 ][ y0 ] | ae(v) |
|     ... | |
|   } | |
|   if( CuPredMode[ chType ][ x0 ][ y0 ] != MODE_INTRA && !pred_mode_plt_flag && general_merge_flag[ x0 ][ y0 ] = = 0 ) | |
|     cu_cbf | ae(v) |
|   if( cu_cbf ) { | |
|     ... | |
|     if( sps_act_enabled_flag && CuPredMode[ chType ][ x0 ][y0 ] != MODE_INTRA && treeType = = SINGLE_TREE ) | |
|       cu_act_enabled_flag | ae(v) |
|         mts_idx | ae(v) |
|     ... | |
| } | | sps_log 2_act_threshold_minus4+4 specifies the block size threshold of applying ACT. When the size of a block is larger than the threshold, ACT is not siangled but inferred as off for the block. Otherwise, ACT on/off information may be signaled for the block.

As such, the third group of embodiments provides a mechanism to limit usage of ACT at the block level based on block size, such that inverse ACT process does not exceed a buffer size of the decoder.

Returning to FIG. 4, the current CU is reconstructed based on the residual information and the prediction information (S408). The residual information may be added with the prediction information based on prediction mode to reconstruct the current CU.

Embodiments of the present disclosure provides various coding methods for controlling color component processing at residual domain. The color component processing may include adaptive color transform, block-based delta pulse code modulation for chroma components, and Joint Cb Cr Residual coding. In some embodiments, signaling of one type of color component processing may affect other type(s) of color component processing, to enhance coding efficiency. In some embodiments, size limitation on adaptive color transform at block level is provided to accommodate buffer size requirement at the decoder.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

The disclosed embodiments are examples only. One of ordinary skill in the art would appreciate that suitable software and/or hardware (e.g., a universal hardware platform) may be included and used to perform the disclosed methods. For example, the disclosed embodiments can be implemented by hardware only, which alternatively can be implemented by software only or a combination of hardware and software. The software can be stored in a storage medium. The software can include suitable commands to enable any client device (e.g., including a digital camera, a smart terminal, a server, or a network device, etc.) to implement the disclosed embodiments.

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:
1. A method for controlling color component processing for a decoder, comprising:
obtaining a coded video bitstream, the video bitstream being coded from a source having a RGB color format;
decoding, signaling information of a current coding unit (CU) in a segment of a current picture from the coded video bitstream, the signaling information includes prediction information of the current CU and a control signal for processing chroma components of the current CU in a prediction residual domain;
determining, according to the control signal, residual information of the current CU, comprising: determining, according to the control signal, adaptive color transform (ACT) enablement information; and when the ACT enablement information indicates that ACT is used for the current CU, obtaining the residual information by converting residuals at YCgCo domain obtained from inverse transform to residuals at RGB domain; and
reconstructing the current CU based on the residual information and the prediction information,
wherein:
the control signal includes a signal directed to a sample level higher than a block level in the video bitstream, the block level being a partitioning level of the current CU; and
the control signal applies to coding units in the same segment, the same picture, or pictures in the same sequence as the current CU based on the sample level.

2. The method according to claim 1, wherein: the control signal is applied to one of: a slice level, a tile group level, a picture level, or a sequence level.

3. The method according to claim 1, wherein:
the control signal includes a sample-level block-based delta pulse code modulation (BDPCM) chroma enabling flag indicating whether BDPCM is applied to at least one chroma coding block belonging to the sample level;
the ACT enablement information includes a sample-level ACT enabling flag directed to the same level as the control signal;
when a value of the sample-level BDPCM chroma enabling flag is 1,
the signaling information does not include the sample-level ACT enabling flag, and a value of the sample-level ACT enabling flag is inferred to be 0;
the signaling information further includes a block-level BDPCM chroma enabling flag indicating whether BDPCM is applied to chroma components of the current CU; and
when a value of the block-level BDPCM chroma enabling flag is 1, determining the residual information of the current CU further comprises determining inverse quantized residuals based on a BDPCM prediction direction indicated by the signaling information and skipping an inverse transform process; and
when the value of the sample-level BDPCM enabling flag is 0,
the signaling information includes the sample-level ACT enabling flag; and
when the value of the sample-level ACT enabling flag is 1, the ACT enablement information further includes a block-level ACT enabling flag indicating whether ACT is used for the current CU.

4. The method according to claim 1, wherein:
the control signal includes a sample-level ACT enabling flag indicating whether ACT is used for at least one CU belonging to the sample level;
the ACT enablement information includes the sample-level ACT enabling flag;
when a value of the sample-level ACT enabling flag is 0,
the signaling information includes a sample-level BDPCM chroma enabling flag indicating whether BDPCM is applied to at least one chroma coding block belonging to the sample level; and
when a value of the sample-level BDPCM chroma enabling flag is 1,
the signaling information further includes a block-level BDPCM enabling flag indicating whether BDPCM is applied to chroma components of the current CU; and
when a value of the block-level BDPCM chroma enabling flag is 1, determining the residual information of the current CU further comprises determining inverse quantized residuals based on a BDPCM prediction direction indicated by the signaling information and skipping an inverse transform process;

when the value of the sample-level ACT enabling flag is 1, the signaling information does not include the sample-level BDPCM chroma enabling flag, the value of the sample-level BDPCM chroma enabling flag is inferred to be 0, and the ACT enablement information further includes a block-level ACT enabling flag indicating whether ACT is used for the current CU.

5. The method according to claim 1, wherein:

the control signal includes a sample-level Joint Cb Cr Residual (JCCR) enabling flag indicating whether joint coding of chroma residuals is enabled for at least one CU belonging to the sample level;

the ACT enablement information includes a sample-level ACT enabling flag directed to the same sample level as the control signal;

when a value of the sample-level JCCR enabling flag is 1,
 the signaling information does not include the sample-level ACT enabling flag, and a value of the sample-level ACT enabling flag is inferred to be 0;
 the signaling information further includes a block-level JCCR flag indicating whether residuals for both chroma components Cb and Cr are coded as a single transform block corresponding to the current CU; and
 when a value of the block-level JCCR flag is 1, determining the residual information of the current CU further comprises deriving the residuals for the chroma components Cb and Cr according to transform coefficients of the single transform block; and when the value of the sample-level JCCR enabling flag is 0,
 the signaling information includes the sample-level ACT enabling flag; and
 when the value of the sample-level ACT enabling flag is 1, the ACT enablement information further includes a block-level ACT enabling flag indicating whether ACT is used for the current CU.

6. The method according to claim 1, wherein:

the control signal includes a sample-level ACT enabling flag indicating whether ACT is used for at least one CU belonging to the sample level;

the ACT enablement information includes the sample-level ACT enabling flag;

when a value of the sample-level ACT enabling flag is 0,
 the signaling information includes the sample-level JCCR enabling flag indicating whether joint coding of chroma residuals is enabled for at least one CU belonging to the sample level; and
 when a value of the sample-level JCCR enabling flag is 1,
  the signaling information further includes a block-level JCCR flag indicating whether residuals for both chroma components Cb and Cr are coded as a single transform block corresponding to the current CU; and
  when a value of the block-level JCCR flag is 1, determining the residual information of the current CU further comprises deriving the residuals for the chroma components Cb and Cr according to transform coefficients of the single transform block;

when the value of the sample-level ACT enabling flag is 1, the signaling information does not include the sample-level JCCR enabling flag, the value of the sample-level JCCR enabling flag is inferred to be 0, and the ACT enablement information further includes a block-level ACT enabling flag indicating whether ACT is used for the current CU.

7. The method according to claim 1, wherein:

the control signal includes a block-level JCCR flag indicating whether residuals for both chroma components CU and Cr are jointly coded as a single transform block;

the ACT enablement information includes a block-level ACT enabling flag indicating whether ACT is used for the current CU; and when a value of the block-level JCCR flag is 1, the block-level ACT enabling flag is not included in the signaling information and is inferred to be 0.

8. The method according to claim 1, wherein:

the control signal includes a block-level ACT enabling flag indicating whether ACT is used for the current CU;

the ACT enablement information includes the block-level ACT enabling flag;

when a value of the block-level ACT enabling flag is 1, a block-level JCCR flag for the current CU is not included in the signaling information and is inferred to be 0, the block-level JCCR flag indicating whether residuals for both chroma components CU and Cr are jointly coded as a single transform block.

9. The method according to claim 1, wherein:

the control signal includes a block-level ACT enabling flag indicating whether ACT is used for the current CU;

the signaling information includes a block-level JCCR flag entropy coded using the block-level ACT enabling flag as a context.

10. The method according to claim 8, wherein:

two sets of contexts associated with the block-level ACT enabling flag are added to a context model for entropy coding the block-level JCCR flag, including a first set of contexts corresponding to the block-level ACT enabling flag indicating ACT is used for the current CU and a second set of contexts corresponding to the block-level ACT enabling flag indicating ACT is not used for the current CU.

11. The method according to claim 2, wherein the control signal includes a block size threshold information, and determining, according to the control signal, the ACT enablement information comprises:

when a size of the current CU is larger than the block size threshold information, determining that ACT is disabled for the current CU; and when a size of the current CU is not larger than the block size threshold information, determining that ACT is enabled for the current CU.

12. The method according to claim 11, wherein:

the block size threshold information indicates a threshold of a number of pixels for a CU.

13. The method according to claim 11, wherein:

the block size threshold information indicates at least one of a threshold of block width or a threshold of a block height for a CU.

14. The method according to claim 11, wherein:

the block size threshold information includes a value derived from a block size threshold value using a conversion equation, a data length of the modified value being smaller than a data length of the block size threshold value.

15. An electronic device, comprising: a memory; and a processor coupled to the memory and configured to perform:
  obtaining a coded video bitstream, the video bitstream being coded from a source having a RGB color format;
  decoding, signaling information of a current coding unit (CU) in a segment of a current picture from the coded video bitstream, the signaling information includes prediction information of the current CU and a control signal for processing chroma components of the current CU in a prediction residual domain;
  determining, according to the control signal, residual information of the current CU, comprising: determining, according to the control signal, adaptive color transform (ACT) enablement information; and when the ACT enablement information indicates that ACT is used for the current CU, obtaining the residual information by converting residuals at YCgCo domain obtained from inverse transform to residuals at RGB domain; and
  reconstructing the current CU based on the residual information and the prediction information,
  wherein:
  the control signal includes a signal directed to a sample level higher than a block level in the video bitstream, the block level being a partitioning level of the current CU; and
  the control signal applies to coding units in the same segment, the same picture, or pictures in the same sequence as the current CU based on the sample level.

16. The device according to claim 15, wherein:
  the control signal includes a sample-level block-based delta pulse code modulation (BDPCM) chroma enabling flag indicating whether BDPCM is applied to at least one chroma coding block belonging to the sample level;
  the ACT enablement information includes a sample-level ACT enabling flag directed to the same level as the control signal;
  when a value of the sample-level BDPCM chroma enabling flag is 1,
    the signaling information does not include the sample-level ACT enabling flag, and a value of the sample-level ACT enabling flag is inferred to be 0;
    the signaling information further includes a block-level BDPCM chroma enabling flag indicating whether BDPCM is applied to chroma components of the current CU; and
    when a value of the block-level BDPCM chroma enabling flag is 1, determining the residual information of the current CU further comprises determining inverse quantized residuals based on a BDPCM prediction direction indicated by the signaling information and skipping an inverse transform process; and
  when the value of the sample-level BDPCM enabling flag is 0,
    the signaling information includes the sample-level ACT enabling flag; and
    when the value of the sample-level ACT enabling flag is 1, the ACT enablement information further includes a block-level ACT enabling flag indicating whether ACT is used for the current CU.

17. The device according to claim 15, wherein:
  the control signal includes a sample-level Joint Cb Cr Residual (JCCR) enabling flag indicating whether joint coding of chroma residuals is enabled for at least one CU belonging to the sample level;
  the ACT enablement information includes a sample-level ACT enabling flag directed to the same sample level as the control signal;
  when a value of the sample-level JCCR enabling flag is 1,
    the signaling information does not include the sample-level ACT enabling flag, and a value of the sample-level ACT enabling flag is inferred to be 0;
    the signaling information further includes a block-level JCCR flag indicating whether residuals for both chroma components Cb and Cr are coded as a single transform block corresponding to the current CU; and
    when a value of the block-level JCCR flag is 1, determining the residual information of the current CU further comprises deriving the residuals for the chroma components Cb and Cr according to transform coefficients of the single transform block; and
  when the value of the sample-level JCCR enabling flag is 0,
    the signaling information includes the sample-level ACT enabling flag; and
    when the value of the sample-level ACT enabling flag is 1, the ACT enablement information further includes a block-level ACT enabling flag indicating whether ACT is used for the current CU.

18. The device according to claim 15, wherein the control signal includes a block size threshold information, and determining, according to the control signal, the ACT enablement information comprises:
  when a size of the current CU is larger than the block size threshold information, determining that ACT is disabled for the current CU; and
  when a size of the current CU is not larger than the block size threshold information, determining that ACT is enabled for the current CU.

19. The device according to claim 15, wherein:
  the control signal includes a sample-level ACT enabling flag indicating whether ACT is used for at least one CU belonging to the sample level;
  the ACT enablement information includes the sample-level ACT enabling flag;
  when a value of the sample-level ACT enabling flag is 0,
    the signaling information includes a sample-level BDPCM chroma enabling flag indicating whether BDPCM is applied to at least one chroma coding block belonging to the sample level; and
    when a value of the sample-level BDPCM chroma enabling flag is 1,
      the signaling information further includes a block-level BDPCM enabling flag indicating whether BDPCM is applied to chroma components of the current CU; and
      when a value of the block-level BDPCM chroma enabling flag is 1, determining the residual information of the current CU further comprises determining inverse quantized residuals based on a BDPCM prediction direction indicated by the signaling information and skipping an inverse transform process;
  when the value of the sample-level ACT enabling flag is 1, the signaling information does not include the sample-level BDPCM chroma enabling flag, the value of the sample-level BDPCM chroma enabling flag is inferred to be 0, and the ACT enablement information further includes a block-level ACT enabling flag indicating whether ACT is used for the current CU.

20. A non-transitory computer-readable storage medium storing a computer program, the computer program, when being executed by one or more processors, causing the processors to perform:
- obtaining a coded video bitstream, the video bitstream being coded from a source having a RGB color format;
- decoding, signaling information of a current coding unit (CU) in a segment of a current picture from the coded video bitstream, the signaling information includes prediction information of the current CU and a control signal for processing chroma components of the current CU in a prediction residual domain;
- determining, according to the control signal, residual information of the current CU, comprising: determining, according to the control signal, adaptive color transform (ACT) enablement information; and when the ACT enablement information indicates that ACT is used for the current CU, obtaining the residual information by converting residuals at YCgCo domain obtained from inverse transform to residuals at RGB domain; and
- reconstructing the current CU based on the residual information and the prediction information, wherein:
- the control signal includes a signal directed to a sample level higher than a block level in the video bitstream, the block level being a partitioning level of the current CU; and
- the control signal applies to coding units in the same segment, the same picture, or pictures in the same sequence as the current CU based on the sample level.

* * * * *